US012768740B2

(12) United States Patent
Furuse et al.

(10) Patent No.: US 12,768,740 B2
(45) Date of Patent: Oct. 20, 2026

(54) FLOW RATE CONTROLLER AND LEAK TESTER

(71) Applicant: COSMO INSTRUMENTS CO., LTD., Tokyo (JP)

(72) Inventors: Akio Furuse, Tokyo (JP); Toshimitsu Furuse, Tokyo (JP); Ryoichi Furuse, Tokyo (JP)

(73) Assignee: COSMO INSTRUMENTS CO., LTD., Tokyo (JP)

( * ) Notice: Subject to any disclaimer, the term of this patent is extended or adjusted under 35 U.S.C. 154(b) by 325 days.

(21) Appl. No.: 18/643,109

(22) Filed: Apr. 23, 2024

(65) Prior Publication Data

US 2024/0426694 A1 Dec. 26, 2024

(30) Foreign Application Priority Data

Jun. 21, 2023 (JP) ................................ 2023-101510

(51) Int. Cl.
*G01M 3/26* (2006.01)

(52) U.S. Cl.
CPC .................................... *G01M 3/26* (2013.01)

(58) Field of Classification Search
CPC ..... G01M 3/26; G01M 3/3263; G05D 7/0635
See application file for complete search history.

(56) References Cited

U.S. PATENT DOCUMENTS

| | | | | |
|---|---|---|---|---|
| 5,494,225 | A | 2/1996 | Nally et al. | |
| 9,404,828 | B2 * | 8/2016 | Yamaguchi ............. | G01M 3/02 |
| 10,648,572 | B2 | 5/2020 | Sawada et al. | |

FOREIGN PATENT DOCUMENTS

| | | | | | |
|---|---|---|---|---|---|
| CA | 2546239 | C | * | 2/2013 | .......... G01M 3/2807 |
| JP | S47-19948 | | | 6/1972 | |
| JP | S63-121000 | A | | 5/1988 | |
| JP | H03-33566 | A | | 2/1991 | |
| JP | H10-504626 | A | | 5/1998 | |
| JP | H11-280612 | A | | 10/1999 | |
| JP | H11511556 | A | * | 10/1999 | ............. G01M 3/26 |

(Continued)

OTHER PUBLICATIONS

Office Action issued in Japanese Counterpart Patent Appl. No. 2023-101510, dated Jan. 4, 2024, along with an English translation thereof.

(Continued)

*Primary Examiner* — Francis C Gray
(74) *Attorney, Agent, or Firm* — Greenblum & Bernstein, P.L.C.

(57) ABSTRACT

A leak tester that includes a master container, a master side air circuit (master side), a work container, a work side air circuit (work side), a first valve, a second valve, a flow rate control valve, and a differential pressure gauge. A reference product is stored in the master container. A target product is stored in the work container. A first valve controls pressure air which is supplied to the master side and the work side. A second valve connects the master side and the work side with an outside. A flow rate control valve controls an amount of air, the air being emitted from the master side and the work side to the outside or being injected into the master side and the work side from the outside. A differential pressure gauge measures pressure difference between the master side and the work side.

7 Claims, 18 Drawing Sheets

(56) References Cited

FOREIGN PATENT DOCUMENTS

| | | | | | |
|---|---|---|---|---|---|
| JP | 2000-055773 | A | | 2/2000 | |
| JP | 2000-121486 | A | | 4/2000 | |
| JP | 2003-028746 | A | | 1/2003 | |
| JP | 2005-141287 | A | | 6/2005 | |
| JP | 2013-092481 | A | | 5/2013 | |
| JP | 2018-009955 | A | | 1/2018 | |
| WO | WO-2014184895 | A1 | * | 11/2014 | .......... G01M 3/3263 |
| WO | WO2018/021277 | A1 | | 2/2018 | |

OTHER PUBLICATIONS

Office Action issued in Japanese Counterpart Patent Appl. No. 2023-101510, dated May 7, 2024, along with an English translation thereof.

* cited by examiner

FIG. 15A
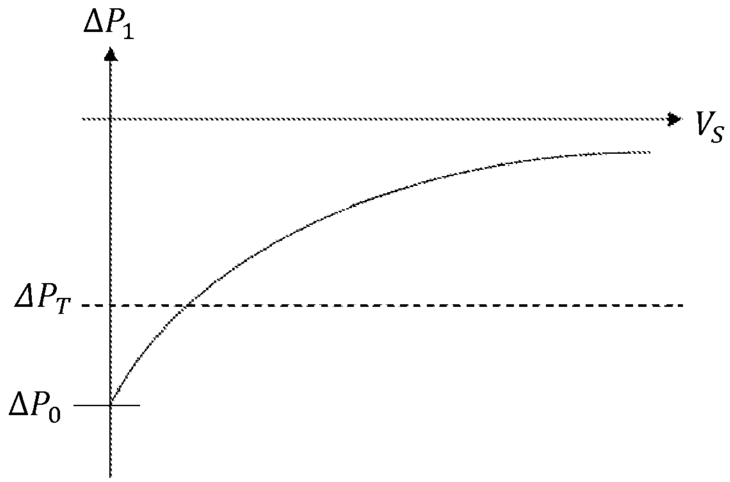
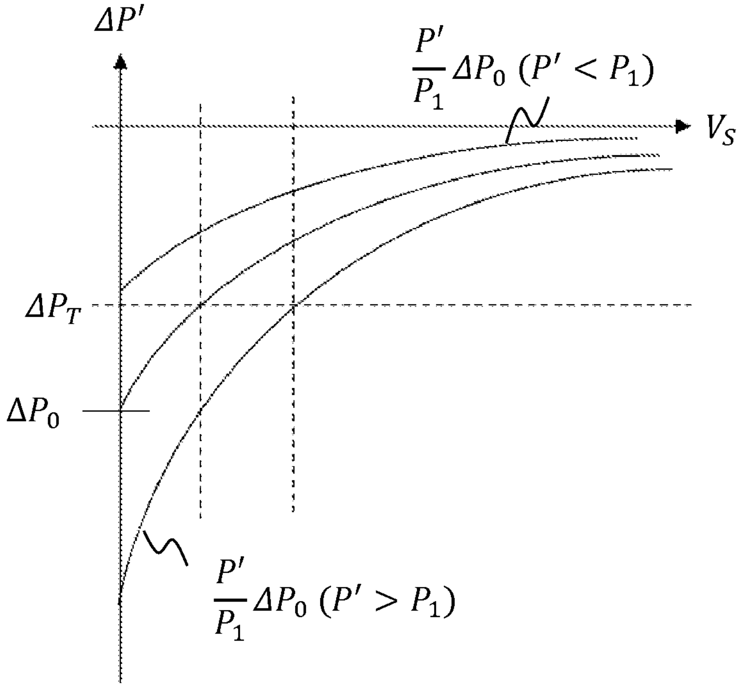
FIG. 15B $$\frac{e_M}{V_C} = \frac{e_W}{V_X} \Rightarrow P_M = P_W$$

$$V_X = \frac{e_W}{e_M} V_C \;\Rightarrow\; P_M - P_W \propto V_S$$

FLOW RATE CONTROLLER AND LEAK TESTER

TECHNICAL FIELD

The disclosed technology relates to a device that inspects air leakage of sealed products by an external pressure method.

BACKGROUND ART

To detect air leakage defects in a sealed product, for example, a product to be inspected (hereinafter "target product") is pressurized in a sealed container so as to check whether air enters the sealed product.

If the defect is small (minor defect), air gradually enters the target product (small leak), and the internal pressure of the sealed container gradually decreases. On the other hand, if the defect is large (major defect), it is considered that air enters the target product immediately while pressurizing the inside of the sealed container (large leak) and pressure change over time cannot be detected even by observing the pressure in the sealed container after completion of the pressurization. Accordingly, a small leak test and a large leak test need to be performed individually.

[Principle of Small Leak Test]

The principle of small leak test will be described with reference to FIG. 1.

101 denotes a sealed container, and 102 denotes a target product.

A target product in atmospheric pressure ($P_0$) is stored in the sealed container 101 and pressure $P_1$ which is greater than $P_0$ is applied in the sealed container.

A volume obtained by excluding an external volume of the target product from the volume of the sealed container 101 is denoted as $V_C$ and an internal volume (volume into which air can enter) of the target product is denoted as $V_S$. In the initial state, the volume $V_S$ of air at pressure $P_0$ and the volume $V_C$ of air at pressure $P_1$ are present in the sealed container.

The air at pressure $P_1$ gradually flows into the target product. Then, the pressure in the sealed container gradually decreases and the pressure in the target product gradually increases.

When the pressure in the sealed container after t seconds is denoted as $P_1$-$\Delta P$ and the flow rate of gas running into the target product measured at atmospheric pressure ($P_0$) is denoted as Q [ml/s], $$P_1 V_C = (P_1 - \Delta P)V_C + QtP_0 \tag{1}$$

is obtained. By transforming Formula (1), $$Q = V_C \cdot \frac{\Delta P}{P_0} \cdot \frac{1}{t} \tag{2}$$

is obtained.

Accordingly, when the target product has a small leak, a leakage flow rate given by the right side of Formula (2) is detected.

The above small leak test is described using the example of pressurizing the target product, but the test can be also performed by depressurizing the target product.

[Principle of Large Leak Test]

The principle of large leak test will be described with reference to FIG. 2.

A master container 201 for storing a reference product 202 and a work container 203 for storing a target product 204 are prepared. It is assumed that the volume of the master container and the volume of the work container are equal to each other.

When the target product has a large leak, a difference is expected to arise between an amount of air in the master container after the reference product is placed in the master container and an amount of air in the work container after the target product is placed in the work container. This air amount difference is used to detect presence of a large leak.

When a volume obtained by excluding the external volume of the reference product from the volume of the master container 201 is denoted as $V_C$, initial pressure is denoted as $P_1$, the substance amount of gas in the master container is denoted as $n_M$ [mol], the temperature is denoted as T, and the gas constant is denoted as R, $$P_1 V_C = n_M RT \tag{3}$$

is obtained.

The target product is stored in the work container 203 and the initial pressure is set to $P_1$ which is the same as that of the master container 201. If the target product has a large leak, the pressure inside the target product rapidly becomes to be equal to the pressure in the work container. When the internal volume (volume into which air can enter) of the target product is denoted as $V_S$, volume $V_C$+$V_S$ of air at pressure $P_1$ is present in the work container. When the substance amount of air in the work container is denoted as $n_W$ [mol] and the temperature is set to T which is the same as that of the master side, $$P_1(V_C + V_S) = n_W RT \tag{4}$$

is obtained.

The same substance amount ($n_e$) of gas is injected into the master container and the work container. When the pressure of the master container and the pressure of the work container after the injection are denoted as $P_M$ and $P_W$ respectively, $$P_M V_C = (n_M + n_e)RT \tag{5}$$

$$P_W(V_C + V_S) = (n_W + n_e)RT \tag{6}$$

are obtained. From Formulas (3) and (5), $$P_M V_C = P_1 V_C + n_e RT \tag{7}$$

is obtained. From Formulas (4) and (6), $$P_W(V_C + V_S) = P_1(V_C + V_S) + n_e RT \tag{8}$$

is obtained. Setting $n_eRT=E$ to simplify notation, from Formulas (7) and (8), $$P_M - P_W = \left(P_1 + \frac{E}{V_C}\right) - \left(P_1 + \frac{E}{V_C + V_S}\right) = E \cdot \frac{V_S}{V_C(V_C + V_S)} \tag{9}$$

is obtained. Formula (9) shows, if $V_S$ (volume into which air can enter)>0 is satisfied, higher pressure is detected in the master side than in the work side.

Here, a predetermined amount of gas is "injected" in the above-described large leak test, but a predetermined amount of gas may be "emitted" from the master container and the work container. According to Formula (9), if E is positive (injection), $P_M>P_W$, and if E is negative (emission), $P_M<P_W$.

In the present specification, the case E>0 will be referred to as a "fixed-amount injection method", and the case E<0 will be referred to as a "fixed-amount emission method".

Based on the above principles, a related art will be described.

FIG. 3 is an air circuit diagram of a leak tester 3 for a sealed product according to the related art. The leak tester 3 includes a master container 301, a work container 303, a pressurized air supply source 305, a primary pressure adjustment valve 306, a pressure gauge 307, a first valve 308, a differential pressure gauge 309, a second valve 310, a pressure adjustment valve 312, and a third valve 311, and these containers, air supply source, valves, and gauges are connected with each other by pipelines (air paths) that carry air.

Here, the first valve, the second valve, and the third valve may be abbreviated as V1, V2, and V3 respectively.

The first valve 308 is a pair of two-way control valves (two-way control valve having a pair of output ports that are separate and independent when the valve is closed), and distributes pressurized air supplied from the primary pressure adjustment valve 306 to the master container 301 and the work container 303.

The differential pressure gauge 309 is connected to a point A on the air path, which couples the first valve and the master container 301, and a point B on the air path, which couples the first valve and the work container 303.

The second valve 310 is connected to a point C on the air path, which couples the first valve and the master container 301, and a point D on the air path, which couples the first valve and the work container 303.

The air path through V1-A-C-master container is referred to as a "master side air system". The master side air system also includes the air paths of "A-differential pressure gauge" and "C-V2", and the master container.

The air path through V1-B-D-work container is referred to as a "work side air system". The work side air system also includes the air paths of "B-differential pressure gauge" and "D-V2", and the work container.

Inner volumes of the master side air system and the work side air system are preliminarily adjusted to be equal to each other.

Here, in situations where there is no risk of misunderstanding, the "master side air system" may be referred to as the "master side" and the "work side air system" may be referred to as the "work side".

The differential pressure gauge 309 measures a pressure difference between the master side air system and the work side air system.

The second valve 310 is a pair of two-way control valves and emits the air in the master side air system and the air in the work side air system to the outside. The second valve 310 is capable of flowing a large amount of air at a time.

The third valve 311 is a pair of two-way control valves, which can control a gas flow rate, and supplies the same amount of pressurized air, which is supplied from the pressure adjustment valve 312, to the master side air system and the work side air system simultaneously. The third valve 311 is not capable of flowing a large amount of air at a time.

Here, the leak tester 3 can be configured relatively small and inexpensively by using the manifold unit described in International Publication No. WO 2014/184895.

<Preparation for Reference Product and Target Product>

The first valve and the third valve are closed and the second valve is opened. Then, pressure in both the master side air system and the work side air system becomes atmospheric pressure. In this state, a reference product 302 with no air leakage is stored in the master container 301 and a target product 304 is stored in the work container 303. The target product 304 may be a good product with no air leakage or may be a defective product with air leakage.

<Large Leak Test>

The second valve is closed. When a volume obtained by subtracting the external volume of the reference product from the master side air system is denoted as $V_C$, the substance amount included in $V_C$ is denoted as $n_M$, the atmospheric pressure is denoted as $P_0$, and the temperature is denoted as T, the state of the master side air system is given by Formula (3).

The target product may have a volume into which air can enter. This volume is denoted as $V_S$. When the substance amount included in $V_S+V_C$ is denoted as $n_W$, the state of the work side air system is given by Formula (4).

The third valve is opened to inject the same amount of air $n_e$ into the master side and the work side, then the third valve is closed. Then, the states of Formula (5) and Formula (6) are obtained, and if $V_S$ is not zero (if there is a large leak), pressure difference given by Formula (9) is produced between the master side and the work side and the pressure difference is detected by the differential pressure gauge 309.

<Small Leak Test>

When pressure difference is not detected in the large leak test, the test goes to the small leak test.

At the end of the large leak test, the first valve, the second valve, and the third valve are closed.

The first valve is opened to equally apply pressure to the master side air system and the work side air system. This pressure is denoted as $P_1$. The pressure $P_1$ is maintained in the master side having no leaks.

Even if the target product has a small leak, the internal pressure of the target product at the start of the test can be considered to be the atmospheric pressure $P_0$. However, air gradually enters the target product due to the pressure difference between $P_1$ and $P_0$. Differential pressure $\Delta P$ of Formula (2) is produced between the work side and the master side, being detected by the differential pressure gauge 309.

SUMMARY OF THE INVENTION

Flow rate controllable valves generally need to be used at a "critical pressure ratio" or less. The critical pressure ratio is a condition for keeping the amount of gas flowing through a flow rate controllable valve constant.

A pressure ratio is defined as [secondary side pressure]÷[primary side pressure], with the higher pressure side of the valve being the primary side and the lower pressure side of the valve being the secondary side. When the primary side pressure is set constant and the secondary side pressure is reduced, the amount of gas flowing in the valve increases (velocity of the flowing air increases). The velocity of flow cannot be faster than the speed of sound, and the flow rate saturates (becomes a constant value) when the velocity of flow reaches the speed of sound. The pressure ratio in this situation is called a critical pressure ratio.

Related arts have required another air circuit for applying appropriate primary side pressure to a third valve, which is a flow rate controllable valve, in addition to a master side air circuit and a work side air circuit. This has made it difficult to miniaturize leak testers. In addition, conventional flow rate controllable valves have been expensive or have had low durability.

To solve the above-described problems, a leak tester according to the disclosed technology includes a master container, a master side air circuit, a work container, a work side air circuit, a first valve, a second valve, a flow rate control valve, and a differential pressure gauge.

A reference product is stored in the master container and the master container is connected with the master side air circuit.

A target product is stored in the work container and the work container is connected with the work side air circuit.

A first valve controls pressure air which is supplied to the master side air circuit and the work side air circuit.

A second valve connects the master side air circuit and the work side air circuit with an outside.

A flow rate control valve controls an amount of air, the air being emitted from the master side air circuit and the work side air circuit to the outside or being injected into the master side air circuit and the work side air circuit from the outside.

A differential pressure gauge measures pressure difference between the master side air circuit and the work side air circuit.

According to the disclosed technology, a leak tester which is inexpensive, has high durability, and requires short test time can be realized. In addition, a leak tester applicable to both positive pressure test and negative pressure test can be provided.

BRIEF DESCRIPTION OF THE DRAWINGS

FIG. 15A is a diagram for explaining large leak determination according to the third embodiment.

FIG. 15B is a diagram for explaining erroneous determination obtained when test pressure fluctuates in the third embodiment.

DETAILED DESCRIPTION OF THE EMBODIMENTS

Figure 1:
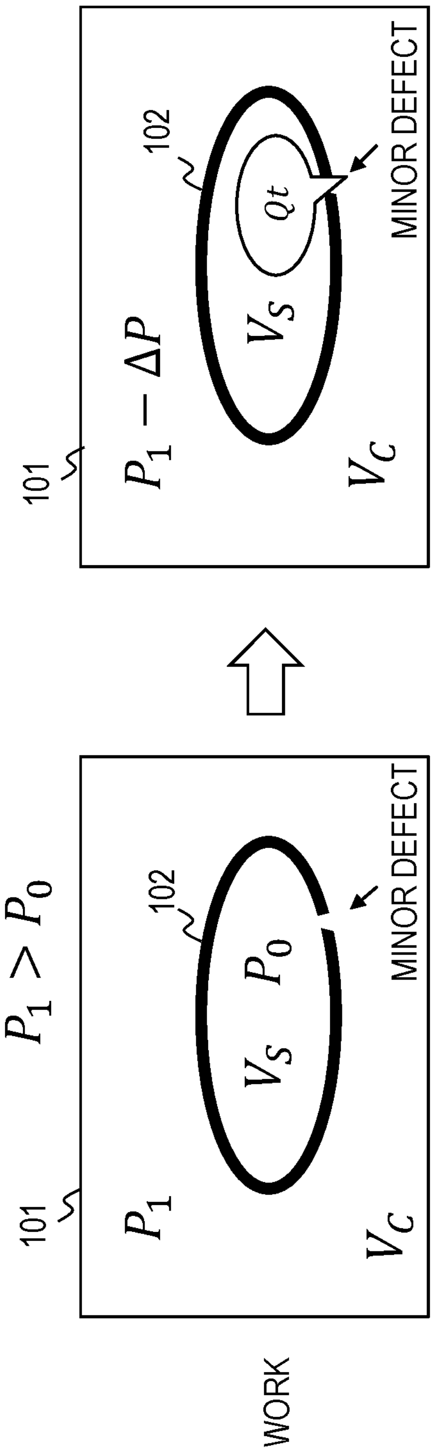
FIG. 1 is a diagram for explaining a principle of small leak test.
Figure 2:
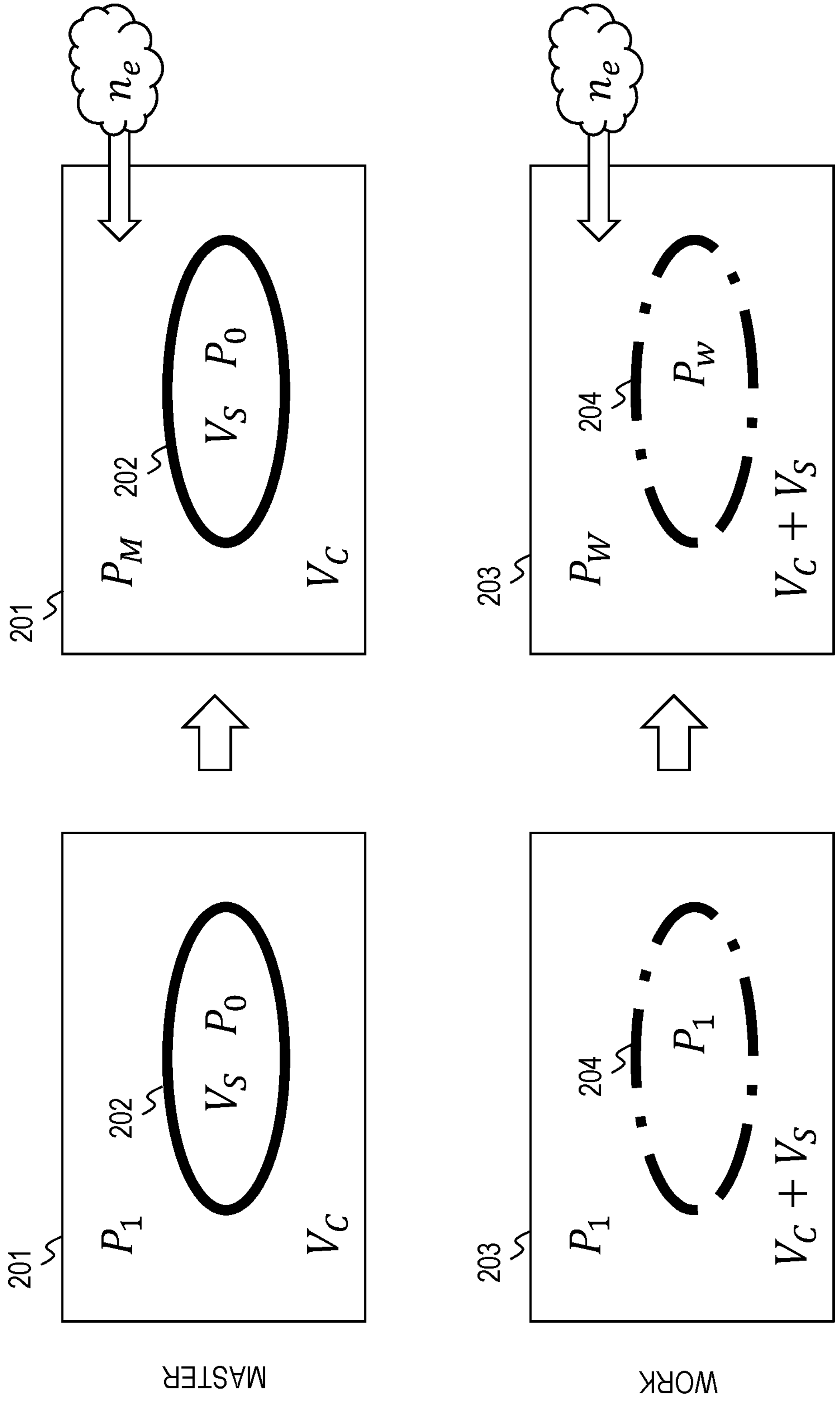
FIG. 2 is a diagram for explaining a principle of large leak test.

Embodiments according to the disclosed technology will be described in detail below. Here, components having the same functions will be provided with the same reference characters and the duplicate description thereof will be omitted.

Both of positive pressure small leak test and negative pressure small leak test are performed by producing pressure difference with respect to atmospheric pressure. As a result of diligent research, the inventors have developed device/method for performing a large leak test using pressure difference between pressure used in a small leak test and atmospheric pressure, and an "orifice incorporated valve" suitable for the device/method.

Different from the related art, the developed technology (disclosed technology) first performs a small leak test and then performs a large leak test. The fixed-amount emission method will be described in a first embodiment, and the fixed-amount injection method will be described in a second embodiment. Then, the orifice incorporated valve will be described.

First Embodiment

Figure 4:
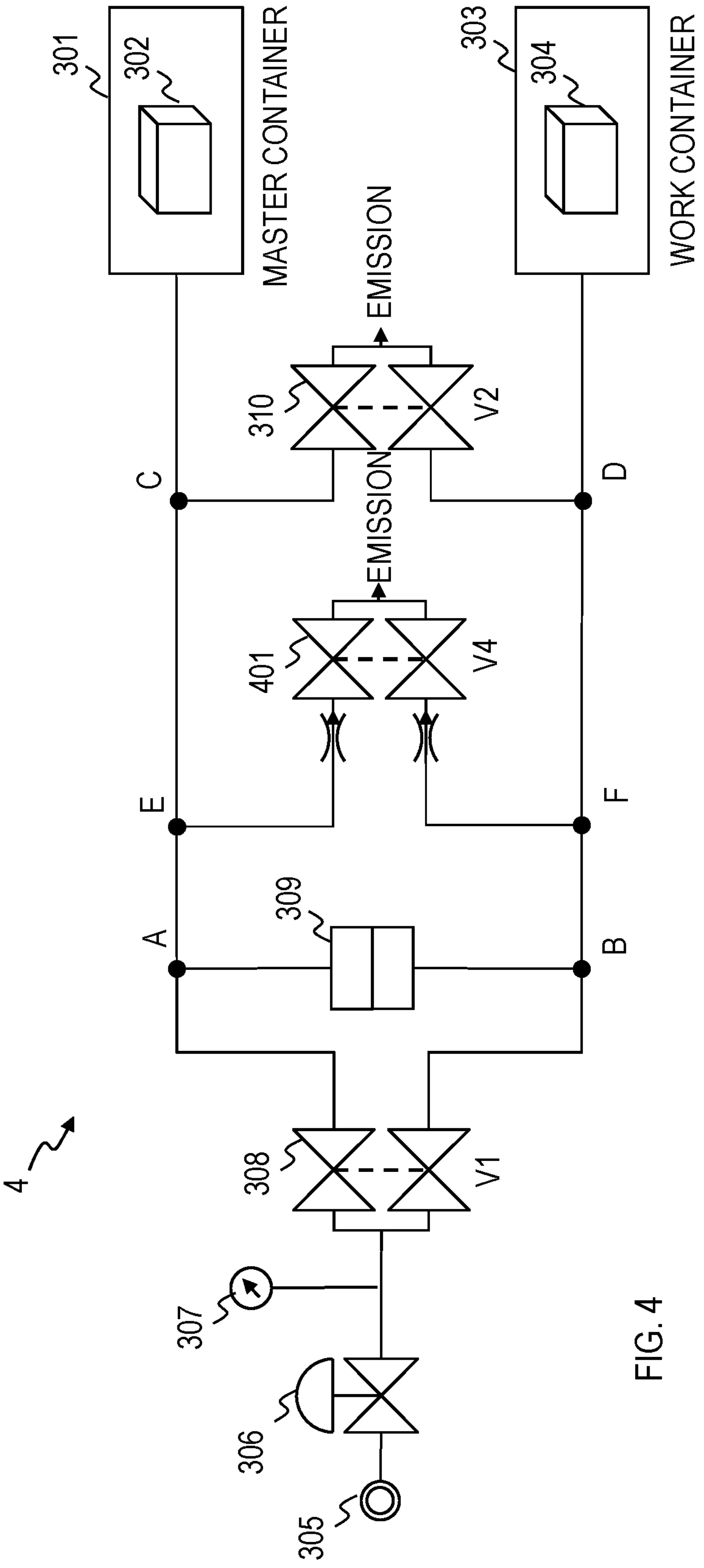
FIG. 4 is an air circuit diagram for explaining a leak tester according to a first embodiment.

FIG. 4 is an air circuit diagram illustrating a configuration example of a leak tester 4 according to the first embodiment.

Figure 3:
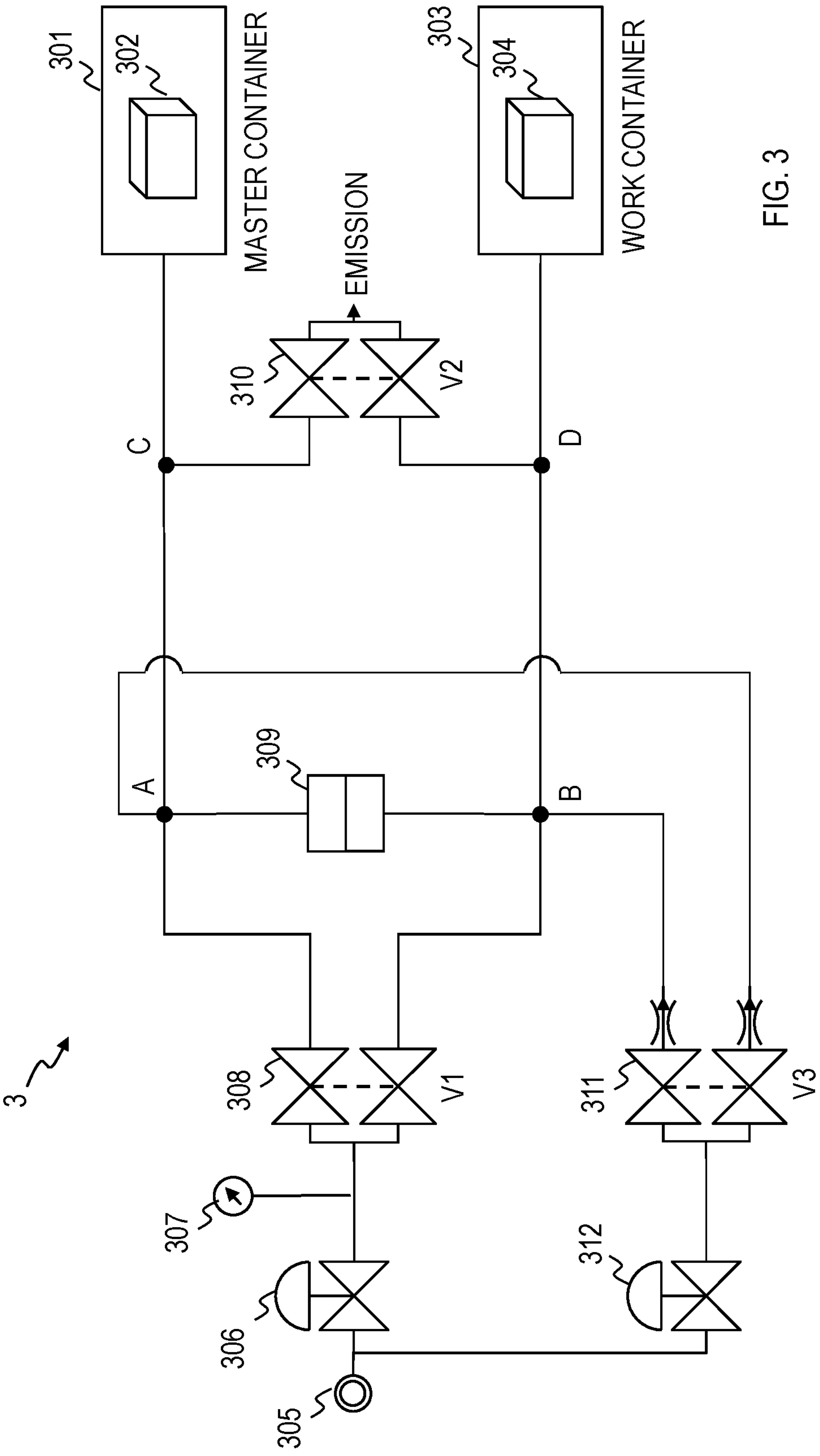
FIG. 3 is an air circuit diagram for explaining a leak tester according to a related art.

FIG. 4 is different from FIG. 3 in that a fourth valve 401 is provided in place of the pressure adjustment valve 312 and the third valve 311. The fourth valve may be abbreviated as V4.

The fourth valve 401 is connected to a point E on the air path, which couples the first valve 308 and the master container 301, and a point F on the air path, which couples the first valve 308 and the work container 303.

The fourth valve 401 is a pair of two-way control valves which can control a gas flow rate and can simultaneously emit the same amount of gas from the master side air system and the work side air system to the outside.

In the first embodiment, the air path through "V1-A-E-C-master container" is referred to as a "master side air system". The master side air system also includes the air paths of "A-differential pressure gauge", "C-V2", and "E-V4" and the master container.

The air path through "V1-B-F-D-work container" is referred to as a "work side air system". The work side air system also includes the air paths of "B-differential pressure gauge", "D-V2", and "F-V4" and the work container. The volumes of the master side air system and the work side air system are preliminarily adjusted so as not to generate pressure difference at specified test pressure.

<Preparation for Reference Product and Target Product>

The first valve and the fourth valve are closed and the second valve is opened. Then, pressure in both the master side air system and the work side air system becomes atmospheric pressure (=$P_0$). In this state, the reference product 302 with no air leakage is stored in the master container 301 and the target product 304 is stored in the work container 303. The target product 304 may be a good product with no air leakage or may be a defective product with air leakage.

<Small Leak Test>

When the second valve is closed and the first valve is opened, pressurized air is supplied to the master side air system and the work side air system. The pressure gauge 307 is monitored, and the first valve is closed when desired air pressure is reached. At this stage, the pressure is equal between the master side air system and the work side air system whether the target product is a good product, a major defective product, or a minor defective product. This pressure is denoted as $P_1$.

A volume obtained by subtracting the external volume of the reference product from the master side air system is denoted as $V_C$.

The target product may have a volume into which air can enter. When this volume is denoted as $V_S$, the volume of the work side air system is $V_S+V_C$.

When the target product 304 is a minor defective product, the pressure of the work side gradually decreases.

The differential pressure gauge 309 detects pressure difference given by Formula (2) of "the principle of small leak test" and a leakage flow rate Q is measured.

When the target product is a good product or a major defective product, pressure difference is not detected in the small leak test. This is because air does not enter the target product in the work side when the target product is a good product. Also, this is because the area of the target product where air can enter immediately becomes pressure $P_1$ when the target product is a major defective product.

<Large Leak Test>

When the target product is determined as a good product (acceptance determination) in the small leak test, the test goes to a large leak test. At the end of the small leak test, the first valve, the second valve, and the fourth valve are all closed.

Even when the acceptance determination is obtained in the small leak test, ΔP in Formula (2) is not always zero. The disclosed technology uses pressure in a small leak test to perform a large leak test, and this point will be described.

The description of "the principle of large leak test" has assumed that the master side pressure and the work side pressure before the large leak test are equal: $P_1$. Instead, if the work side pressure before the large leak test is $P_1$-ΔP, Formula (8) changes as the following.

$$P_W(V_C+V_S)=(n_W+n_e)RT=(P_1-\Delta P)(V_C+V_S)+n_eRT \tag{10}$$

From Formulas (7) and (10) and $E=n_eRT$, $$P_M-P_W=\Delta P+\frac{E}{V_C}\,\frac{E}{(V_C+V_S)}=\Delta P+E\cdot\frac{V_S}{V_C(V_C+V_S)} \tag{11}$$

is obtained. Namely, even when a large leak test is performed with the work side pressure which is $P_1$-ΔP, the influence of a small leak test can be eliminated by subtracting ΔP from pressure difference obtained in the large leak test.

Therefore, pressure difference ΔP at the acceptance determination is first recorded. Then, the fourth valve is opened and closed for a specified period of time so as to emit predetermined substance amount ($n_e$ [mol]) of gas to the outside. The pressure of the master side air system and the pressure of the work side air system after the emission are denoted as $P_M$ and $P_W$ respectively.

The pressure difference between $P_M$ and $P_W$ detected by the differential pressure gauge 309 is Formula (11). When ΔP is subtracted from $P_M$-$P_W$ of Formula (11), the right side of Formula (9) (pressure difference caused by the presence of the large leak $V_S$) is obtained.

Since this is the fixed-amount emission method, the sign of E is opposite. That is, (based on the assumption that $V_S$ is a positive value) the work side pressure $P_W$ is larger than the master side pressure $P_M$ in the fixed-amount emission method.

<Test End>

At the end of the large leak test, the first valve, the second valve, and the fourth valve are closed.

The second valve is opened so as to allow the pressure of the master side air system and the work side air system to return to the atmospheric pressure. Subsequently, the work container is opened, the target product is replaced, and the next inspection is performed.

The above is the description of the leak tester according to the first embodiment.

First Modification

The secondary side (low pressure side) of the fourth valve (flow rate control valve) is set at atmospheric pressure in the first embodiment.

A leak test is sometimes desired to be performed under a pressure close to atmospheric pressure. This case sometimes makes it impossible to obtain a sufficiently small pressure ratio between the primary side (high pressure side) and the secondary side, whereby the critical pressure ratio is not reached.

As a result, flow rate control in the fourth valve (controlled gas emission from the master side and the work side) becomes unstable.

Therefore, a first modification sets the secondary side of the fourth valve at negative pressure so as to reduce a pressure ratio.

Here, positive pressure is a pressure whose value becomes positive when atmospheric pressure is subtracted from absolute pressure, and negative pressure is a pressure whose value becomes negative when atmospheric pressure is subtracted from absolute pressure. Pressure obtained by subtracting atmospheric pressure from absolute pressure is called "gauge pressure". Absolute pressure is a pressure at which a vacuum is zero [Pa] and one [atm] is 101.3 [kPa].

Figure 5:
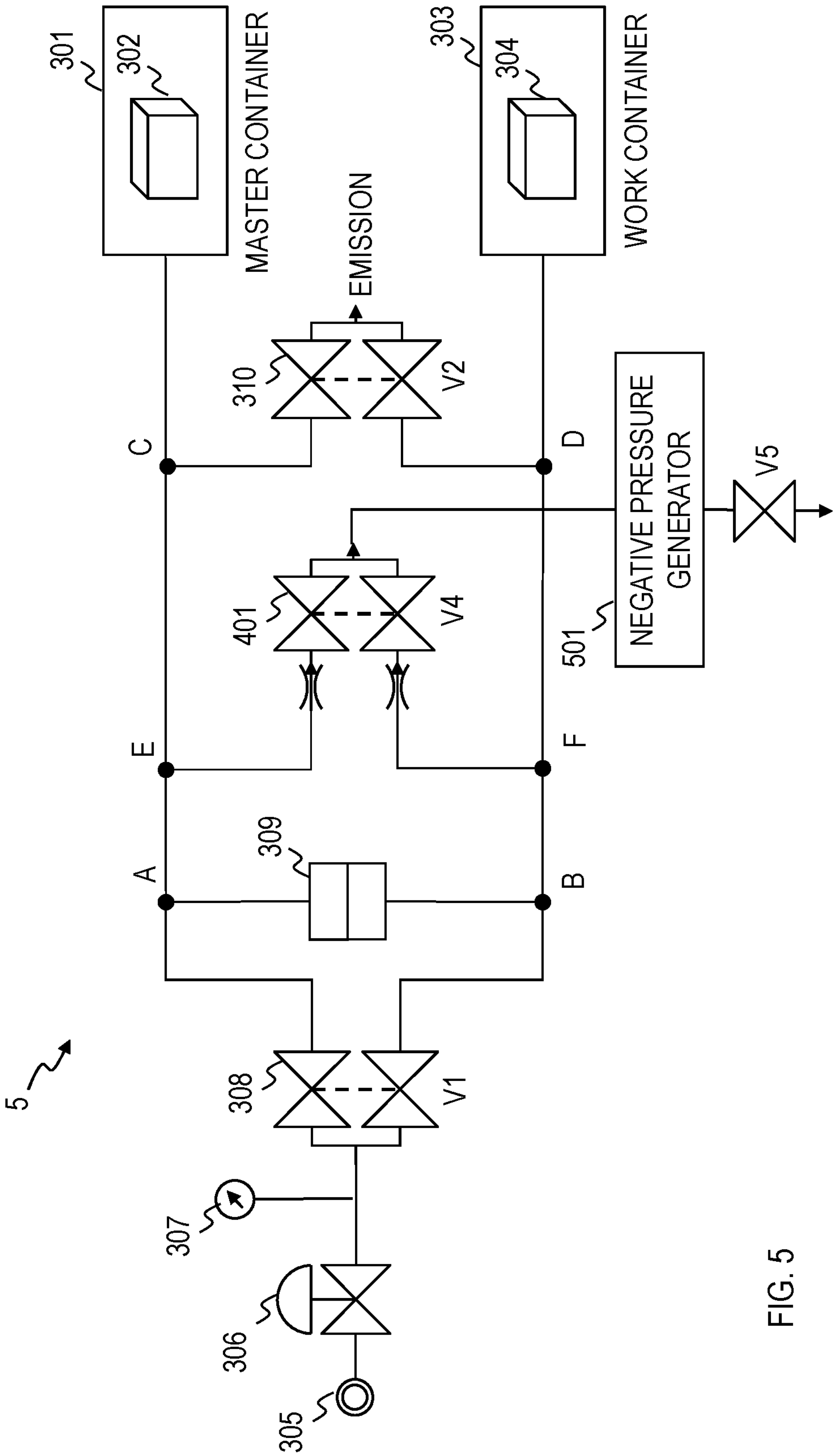
FIG. 5 is an air circuit diagram for explaining a leak tester according to a first modification.

FIG. 5 is an air circuit diagram illustrating a configuration example of a leak tester 5 according to the first modification.

FIG. 5 is different from FIG. 4 in that a negative pressure generator 501 is connected to an emission side of the fourth valve.

The operation of the first modification is the same as that of the first embodiment except for the point that the negative pressure generator reduces or controls a pressure ratio of the fourth valve.

Second Embodiment

The first embodiment has applied positive pressure to a sealed product to test whether air enters the sealed product. The second embodiment will apply negative pressure to a sealed product to test for leaks.

Figure 6:
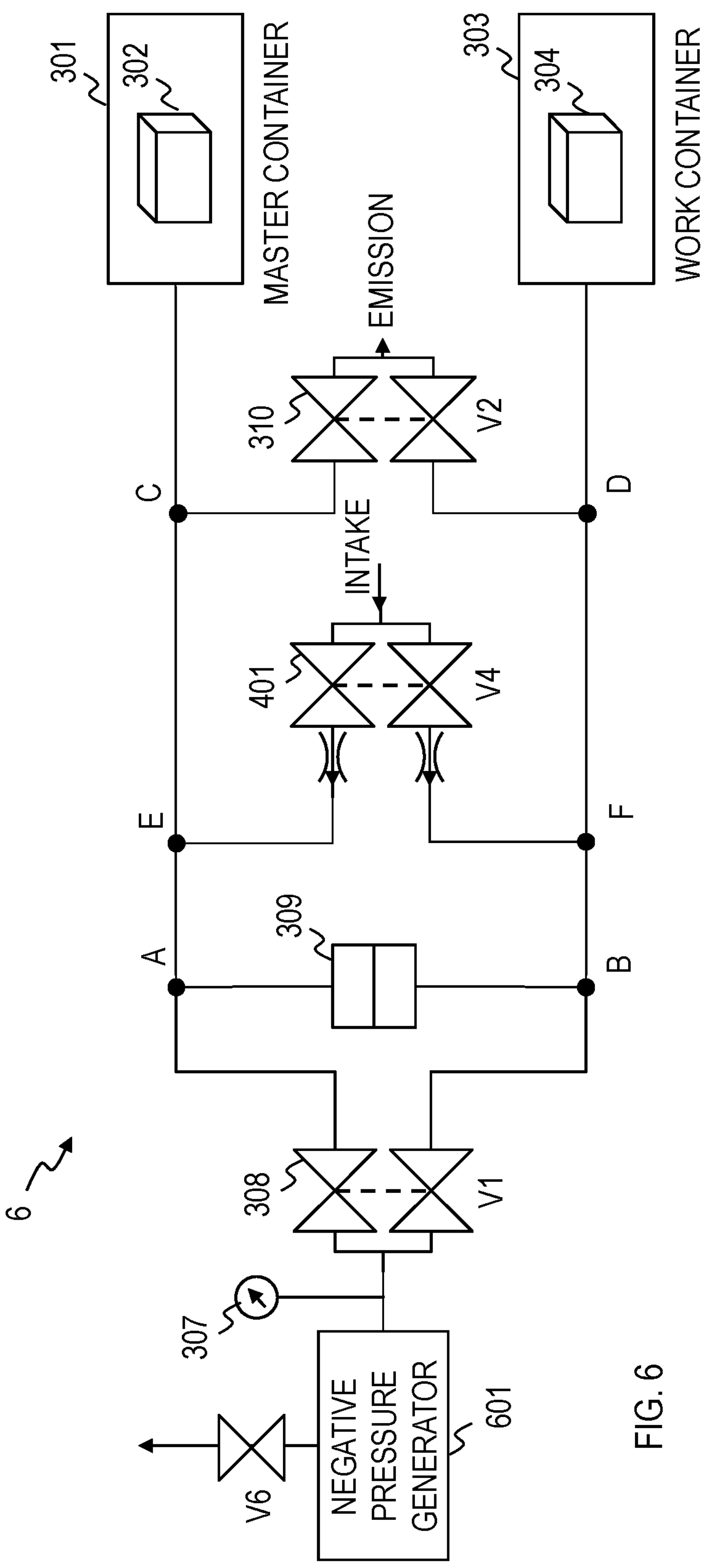
FIG. 6 is an air circuit diagram for explaining a leak tester according to a second embodiment.

FIG. 6 is an air circuit diagram illustrating a configuration example of a leak tester 6 according to the second embodiment.

FIG. 6 is different from FIG. 4 in that a negative pressure generator 601 is provided in place of the pressurized air supply source 305 and the primary pressure adjustment valve 306.

<Preparation for Reference Product and Target Product>

The first valve and the fourth valve are closed and the second valve is opened. Then, pressure in both the master side air system and the work side air system becomes atmospheric pressure ($=P_0$). In this state, the reference product 302 with no air leakage is stored in the master container 301 and the target product 304 is stored in the work container 303. The target product 304 may be a good product with no air leakage or may be a defective product with air leakage.

<Small Leak Test>

When the second valve is closed and the first valve is opened, the master side air system and the work side air system are depressurized by the action of the negative pressure generator 601. The pressure gauge 307 is monitored, and the first valve is closed when desired air pressure (negative pressure) is reached. At this stage, the pressure is equal between the master side air system and the work side air system whether the target product is a good product, a major defective product, or a minor defective product. This pressure is denoted as $P_1$.

A volume obtained by subtracting the external volume of the reference product from the master side air system is denoted as $V_C$.

The target product may have a volume with air which can leak out. When this volume is denoted as $V_S$, the volume of the work side air system is $V_S+V_C$.

When the target product 304 is a minor defective product, the pressure of the work side gradually increases. The differential pressure gauge 309 detects pressure difference given by Formula (2) of "the principle of small leak test" and a leakage flow rate Q is measured.

When the target product is a good product or a major defective product, pressure difference is not detected in the small leak test. This is because air leakage does not occur in the work side when the target product is a good product. Also, this is because the area of the target product where air can leak out immediately becomes pressure $P_1$ when the target product is a major defective product.

<Large Leak Test>

When the target product is determined as a good product in the small leak test, the test goes to a large leak test. At the end of the small leak test, the first valve, the second valve, and the fourth valve are all closed.

Differential pressure $\Delta P$ at the acceptance determination is first recorded. Then, the fourth valve is opened and closed for a specified period of time so as to inject predetermined substance amount ($n_e$) of gas. The pressure of the master side air system and the pressure of the work side air system after the injection are denoted as $P_M$ and $P_W$ respectively.

The pressure difference between $P_M$ and $P_W$ detected by the differential pressure gauge 309 is Formula (11). When $\Delta P$ is subtracted from $P_M$-$P_W$ of Formula (11), the right side of Formula (9) (pressure difference caused by the presence of the large leak $V_S$) is obtained.

Since the second embodiment employs the fixed-amount injection method, the sign of E is positive. That is, (based on the assumption that $V_S$ is a positive value) the master side pressure $P_M$ is larger than the work side pressure $P_W$ in the fixed-amount injection method.

<Test End>

At the end of the large leak test, the first valve, the second valve, and the fourth valve are closed.

The second valve is opened so as to allow the pressure of the master side air system and the work side air system to return to the atmospheric pressure. Subsequently, the work container is opened, the target product is replaced, and the next inspection is performed.

Second Modification

The primary side (high pressure side) of the fourth valve (flow rate control valve) is set at atmospheric pressure in the second embodiment.

A leak test is sometimes desired to be performed in a low vacuum close to atmospheric pressure. This case sometimes makes it impossible to obtain a sufficiently small pressure ratio between the primary side and the secondary side (low pressure side/work side/master side), whereby the flow rate control in the fourth valve becomes unstable.

Therefore, a second modification sets the primary side of the fourth valve at positive pressure so as to reduce a pressure ratio.

Figure 7:
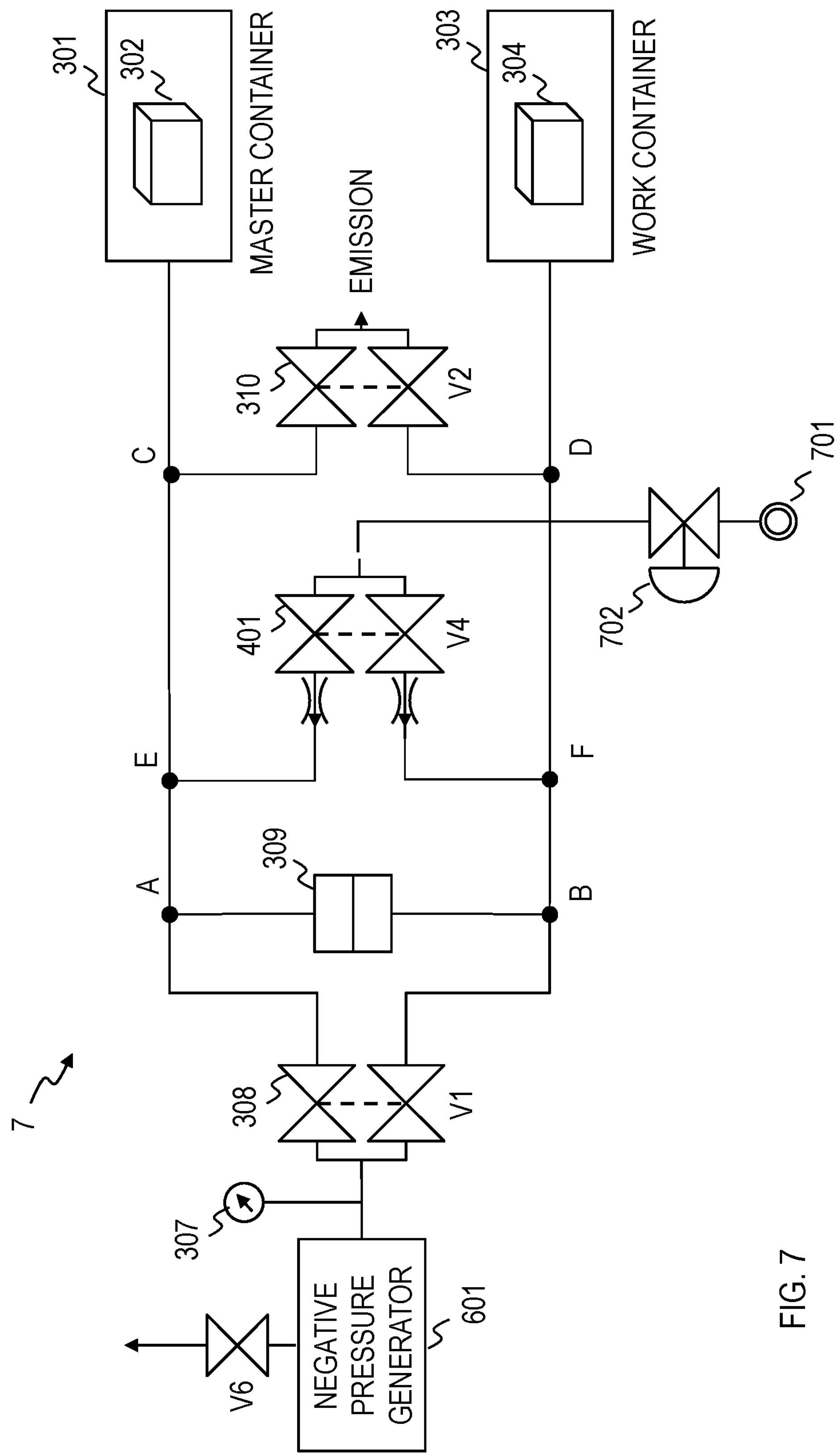
FIG. 7 is an air circuit diagram for explaining a leak tester according to a second modification.

FIG. 7 is an air circuit diagram illustrating a configuration example of a leak tester 7 according to the second modification.

FIG. 7 is different from FIG. 6 in that a pressurized air supply source 701 and a pressure adjustment valve 702 are connected to an intake side of the fourth valve.

The operation of the second modification is the same as that of the second embodiment except for the point that the pressurized air supply source reduces or controls a pressure ratio of the fourth valve.

[Flow Rate Control Valve (Orifice Incorporated Valve)]

A valve favorable for the above-described embodiments will be described. Here, an "orifice" is a small hole in a thin wall through which fluid flows, and a thin plate with such a hole is called an orifice plate.

Figure 8A:
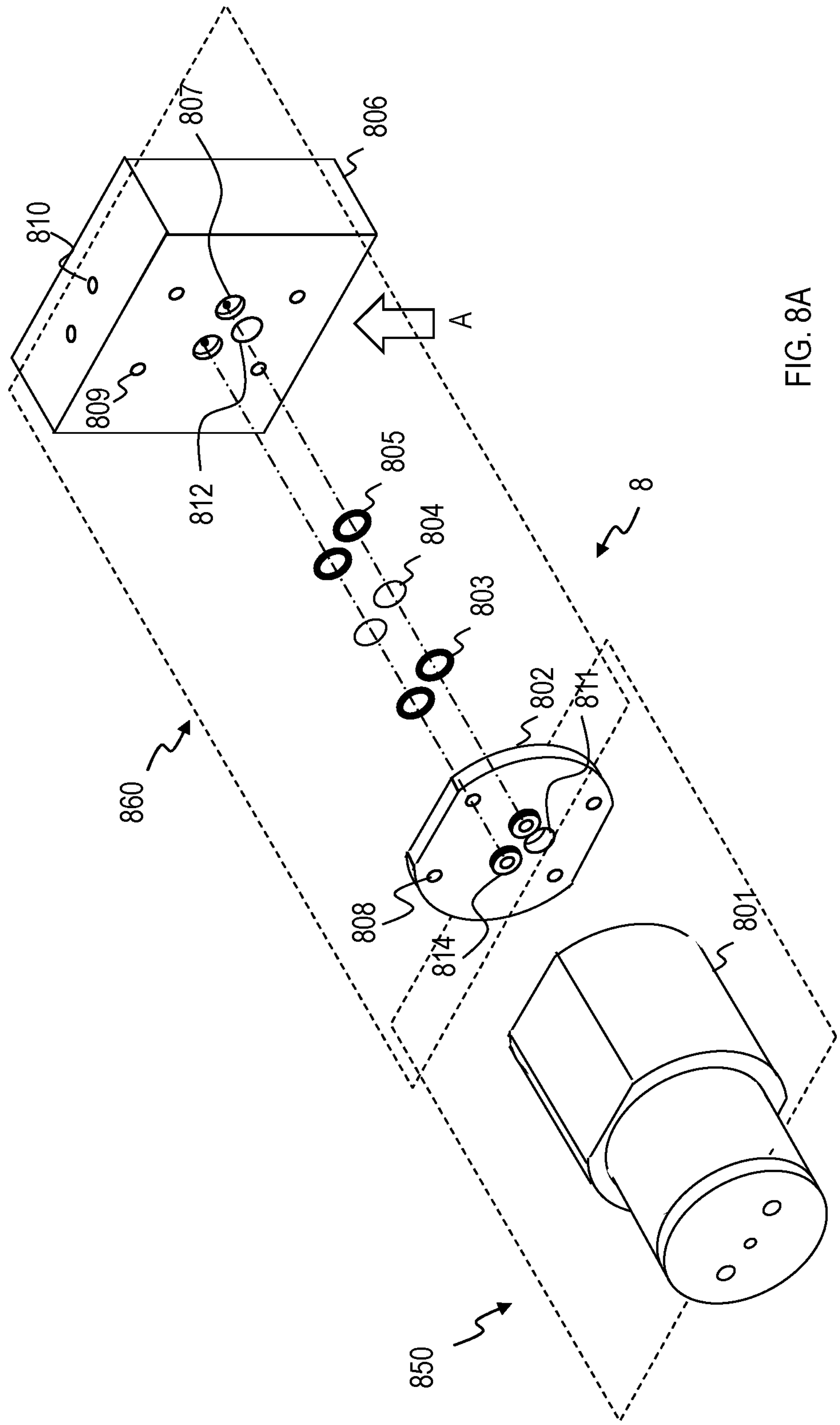
FIG. 8A is an exploded diagram (perspective view) of a flow rate control valve suitable for the disclosed technology.
Figure 8B:
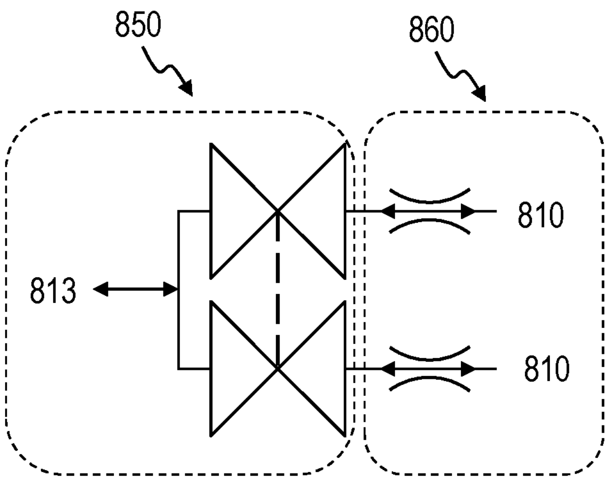
FIG. 8B is a diagram for explaining correspondence between symbols on the air circuit diagram and the exploded diagram (between a valve unit and a flow rate control unit).
Figure 8C:
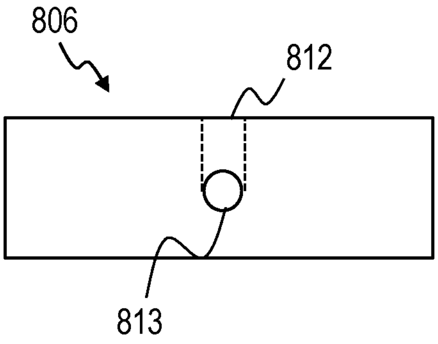
FIG. 8C is a side view of a manifold observed in A direction.
Figure 9A:
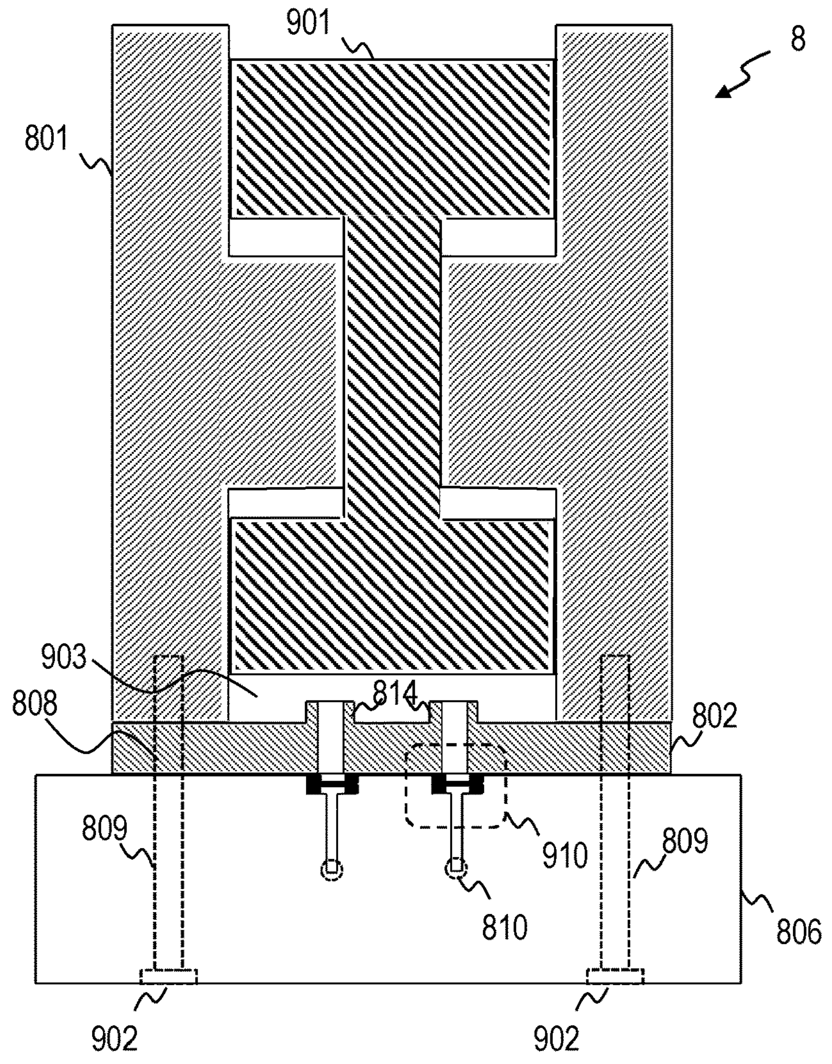
FIG. 9A is an assembly diagram (sectional view) of the flow rate control valve suitable for the disclosed technology.
Figure 9B:
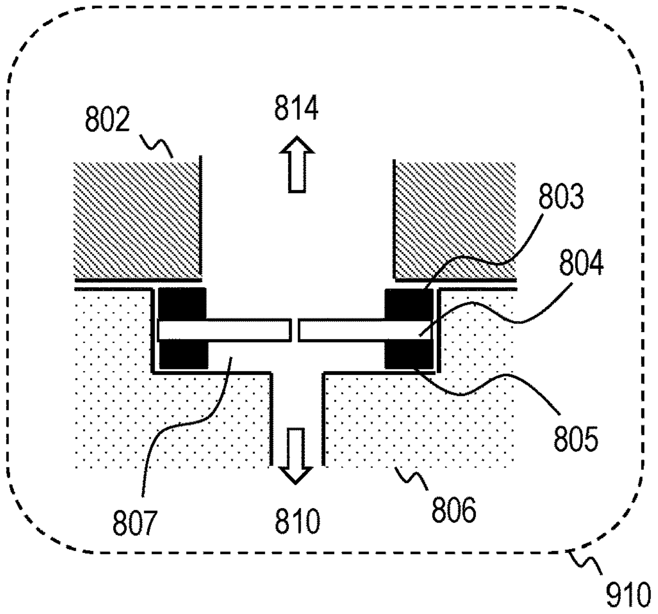
FIG. 9B is an enlarged view of an area around a counterbore.

FIGS. 8A, 8B, and 8C are exploded diagrams (perspective views) of a flow rate control valve favorable as the fourth valve of the first and second embodiments, and FIGS. 9A and 9B are assembly diagrams (sectional views) of the same.

FIG. 8A is an overall exploded diagram. FIG. 8B shows symbols on the air circuit diagram, where a block 850 of a flow rate control valve 8 corresponds to a valve unit and a block 860 corresponds to a flow rate control unit. FIG. 8C is a side view of a manifold 806 observed in A direction of FIG. 8A.

FIG. 9A is an overall assembly diagram, and FIG. 9B is an enlarged view of an area around a counterbore 807.

The configuration and an opening/closing operation of the flow rate control valve 8 will be described in detail below with reference to FIGS. 8A, 8B, and 8C and FIGS. 9A and 9B.

<Operation Valve>

An operation valve 801 includes a movable piston 901 inside (see FIG. 9A).

<Chip Plate>

A chip plate 802 has two protrusions 814, an intake/emission hole 811, and four fixing holes 808.

The intake/emission hole 811 and the fixing holes 808 are through holes. The protrusion 814 also has a through hole on the center thereof.

<Manifold>

The manifold 806 has two counterbores 807, an intake/emission hole 812, four fixing holes 809, two introduction ports 810, and an intake/emission port 813 (see FIG. 8C).

The counterbore 807 has a hole on the bottom portion thereof and communicates with the introduction port 810 inside the manifold.

The intake/emission hole 812 communicates with the intake/emission port 813 inside the manifold.

The fixing holes 809 are through holes.

<Orifice>

An orifice plate 804 is a metal plate having a fine hole on the center thereof. The orifice plate 804 is accommodated in the counterbore 807 of the manifold with O rings 803 and 805.

<Assembly Diagram>

The operation valve 801, the chip plate 802, and the manifold 806 are integrally fixed with screws 902 which penetrate through the fixing holes 808 and 809.

The orifice plate 804 is accommodated in the counterbore 807 in a manner to be sandwiched by the O rings 803 and 805, and the O rings are airtightly pressed by the chip plate 802 and the manifold 806 (see FIG. 9B).

A space 903 between the operation valve 801 and the chip plate 802 communicates with the outside air through the intake/emission hole 811 of the chip plate 802 and the intake/emission hole 812 and the intake/emission port 813 of the manifold 806.

The two introduction ports 810 are connected with the master side air system and the work side air system. As a result, the space 903 is connected with the master side air system and the work side air system by the through holes of the protrusions 814, the holes on the bottom portions of the counterbores 807, and the introduction ports 810.

<Valve Opening/Closing Operation>

The piston 901 moves up and down. The piston 901 descends and closes the through holes of the protrusions 814, blocking the air path between the introduction port 810 and the intake/emission port 813 (valve close). The piston 901 rises and opens the through holes of the protrusions 814, conducting the air path between the introduction port 810 and the intake/emission port 813 (valve open).

[Modification of Flow Rate Control Valve]

When an orifice plate with small diameter of hole is desired to be obtained, large thickness of the plate makes drilling difficult. However, small thickness of the plate reduces the stiffness of the orifice plate and causes distortion when a large pressure difference is applied. The distortion changes flow rate characteristics of the orifice incorporated valve.

Accordingly, orifice plates are doubly layered so as to increase pressure resistance.

Figure 10A:
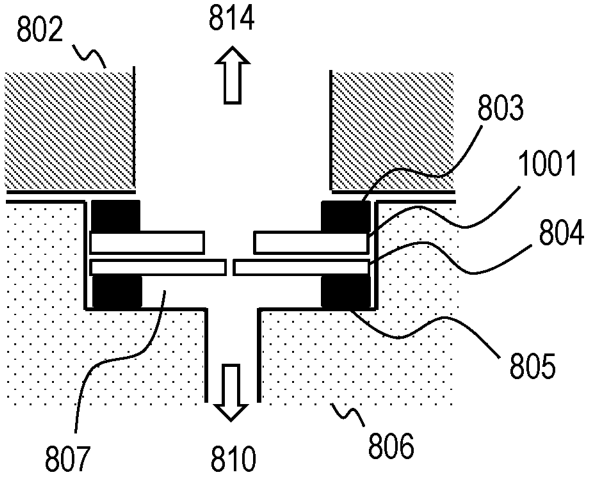
FIG. 10A is an enlarged view of an area around a counterbore, for explaining a modification of the flow rate control valve.
Figure 10B:
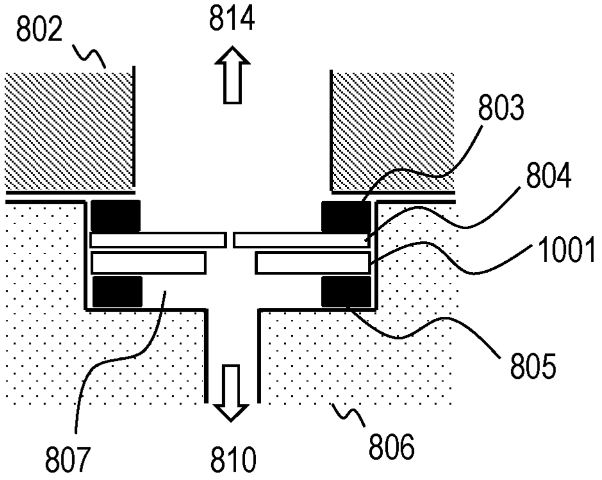
FIG. 10B is an enlarged view of an area around a counterbore, for explaining another modification of the flow rate control valve.

FIGS. 10A and 10B illustrate an area around an orifice of a flow rate control valve according to the modification in an enlarged manner, and correspond to FIG. 9B. 1001 denotes a back-up orifice plate.

The introduction port 810 communicates with the master side air system or the work side air system. The protrusion 814 communicates with the intake/emission port 813 (that is, the outside air).

Accordingly, the introduction port 810 direction is the high pressure side and the protrusion 814 direction is the low pressure side in the positive pressure test as that in the first embodiment (and the first modification), and a force is applied to the orifice plate in the protrusion 814 direction. Therefore, in the positive pressure test, the back-up orifice plate 1001 is interposed between the orifice plate 804 and the O ring 803 so as to support the orifice plate 804 from the low pressure side, as illustrated in FIG. 10A.

The protrusion 814 direction is the high pressure side and the introduction port 810 direction is the low pressure side in the negative pressure test as that in the second embodiment (and the second modification), and a force is applied to the orifice plate in the introduction port 810 direction. Therefore, in the negative pressure test, the back-up orifice plate 1001 is interposed between the orifice plate 804 and the O ring 805 so as to support the orifice plate 804 from the low pressure side, as illustrated in FIG. 10B.

The back-up orifice plate 1001 has a hole which is concentric with the fine hole of the orifice plate 804 and has a larger diameter than the fine hole. This can increase the stiffness of the orifice portion without affecting the flow rate characteristics which are determined by the diameter of the fine hole of the orifice plate 804.

[Test Result of Orifice Incorporated Valve]

It will be described below that an orifice incorporated valve has flow rate characteristics similar to those of a critical nozzle. In addition, usage conditions when the orifice is considered as a pseudo critical nozzle will be described.

Experiment 1

Results obtained when an orifice incorporated valve was applied to the large leak test of the second modification will be shown.

Figure 11A:
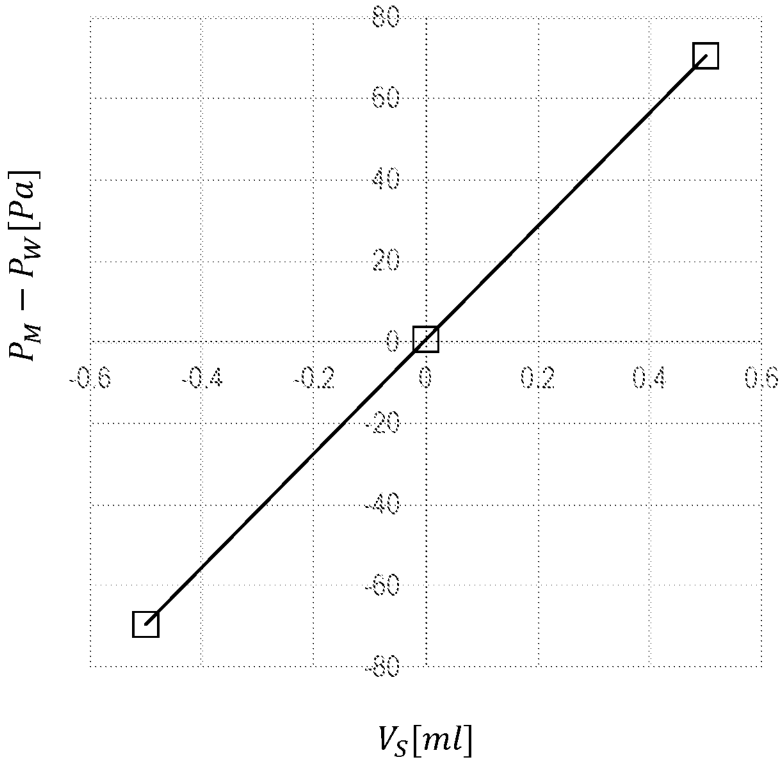
FIG. 11A is a diagram showing experimental values of the second modification.

FIG. 11A shows the results of the pressure difference ($P_M$-$P_W$) measured by applying −0.5 ml, 0 ml, and 0.5 ml as $V_S$ under the conditions of orifice hole diameter d=0.15 mm, $V_C$=50 ml, secondary side pressure $P_3$=11.3 kPa (=gauge pressure −90 kPa), primary side pressure 201.3 kPa (=gauge pressure 100 kPa), and valve opening 0.5 s.

In this experiment, $V_S$ was generated by changing the work side volume instead of using a target object (same for Experiment 2). The result shows the detection of pressure difference of approximately 70 Pa where there is a large leakage space of 0.5 ml in a target product in a test system with an internal volume of 50 ml.

In addition, E is positive because the "fixed-amount injection" is performed, and when $V_S$ is positive, $P_M > P_W$ as Formula (9).

The experimental results will be compared with theoretical values for the critical flow of compressible gas. The pressure ratio of Experiment 1 is:

$$\frac{11.3\ \text{kPa}}{201.3\ \text{kPa}} = 0.056 < 0.33 \tag{12}$$

and the conditions of Experiment 1 are sufficiently lower than a so-called critical pressure ratio 0.33 (mentioned later) of a critical nozzle.

First, the mass flow rate [kg/s] of a sonic jet of compressible fluid is well known, and is given, for example, by the formula on slide 28 of G. F. Hewitt, "NTEC Module: Water Reactor Performance and Safety, Lecture 9: Critical flow", https://www.imperial.ac.uk/media/imperial-college/research-centres-and-groups/nuclear-engineering/9-Critical-flow.pdf.

The mass flow rate is converted into an expression in terms of gas flow rate $Q_{CR}$ [Pa m$^3$/s], and the term consisting of a specific heat ratio is simplified by placing σ (critical flow coefficient) to obtain Formula (13).

$$Q_{CR} = P_u A \sqrt{\frac{RT}{M}} \cdot \sigma \left[\text{Pa} \cdot \frac{\text{m}^3}{\text{s}}\right] \tag{13}$$

Here, $P_u$ denotes the primary side pressure, A denotes an aperture area, R denotes a gas constant [=8.31 J/mol·K], T denotes a temperature [K] of gas flowing into the nozzle, and M denotes molecular weight [kg/mol].

The following values are substituted into Formula (13).

$$A = \pi\left(\frac{d}{2}\right)^2 = 1.77 \times 10^{-2}[\text{mm}^2] = 1.77 \times 10^{-8}[\text{m}^2] \tag{14}$$
$$M = 29\left[\frac{\text{g}}{\text{mol}}\right] = 0.029\left[\frac{\text{kg}}{\text{mol}}\right]$$
$$T = 20[°\ \text{C.}] = 293[\text{K}]$$
$$R = 8.31\left[\frac{\text{J}}{\text{mol} \cdot \text{K}}\right]$$
$$\sigma = 0.685$$

As a result, $$Q_{CR} = 3.51 \times 10^{-6} P_u \left[\text{Pa} \cdot \frac{\text{m}^3}{\text{s}}\right] \tag{15}$$

is obtained.

$Q_{CR}$×time (t) is nothing but E (=$n_e$RT) in Formula (9).

$$E = Q_{CR} t \tag{16}$$

Since valve opening time t=0.5 s and the primary side pressure Pu=201.3 kPa, $$E = (3.51 \times 10^{-6}) \times (201.3 \times 10^3) \times 0.5 \tag{17}$$

-continued $$= 0.353[\text{Pa} \cdot \text{m}^3]$$
$$= 3.53 \times 10^5[\text{Pa} \cdot \text{ml}]$$

is obtained.

From Formula (9) of "the principle of large leak test", Formula (17), and $V_C$=50 ml, $$\begin{aligned} P_M - P_W &= E\frac{V_S}{V_C(V_C + V_S)} \\ &= 3.53 \times 10^5 \times \frac{V_S}{50 \cdot (50 + V_S)} \\ &= 7.07 \times 10^3 \frac{V_S}{50 + V_S}[\text{Pa}] \end{aligned} \tag{18}$$

is obtained. Table 1 shows pressure difference ($P_M$-$P_W$) obtained when-0.5 ml, 0 ml, and 0.5 ml are given as $V_S$.

TABLE 1

| $V_S$ [ml] | $P_M - P_W$[Pa] |
|---|---|
| −0.5 | −71.4 |
| 0 | 0 |
| 0.5 | 70.0 |

Figure 11B:
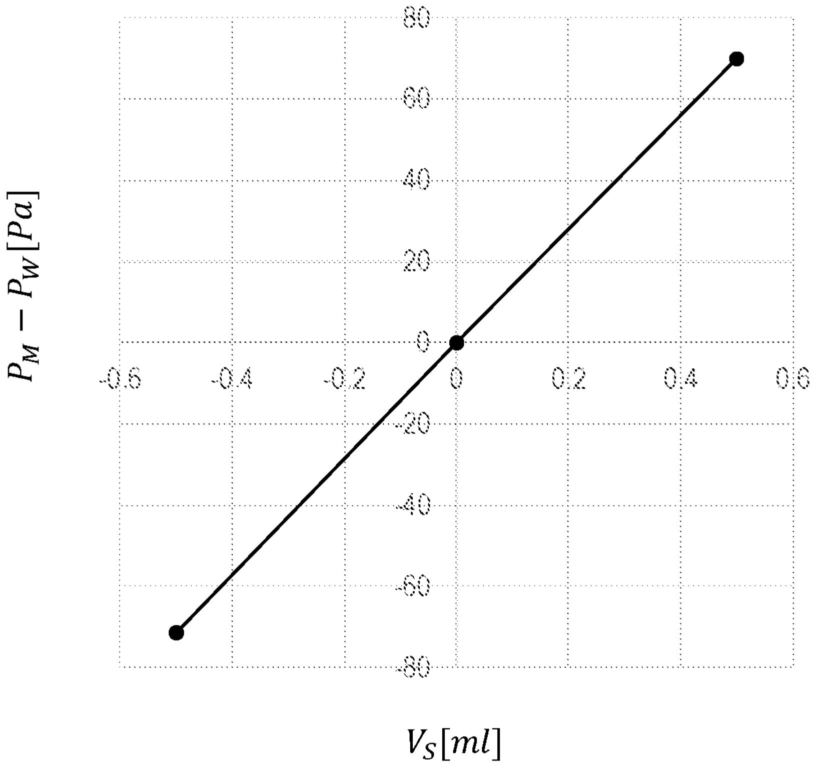
FIG. 11B is a diagram showing theoretical values of the second modification.

FIG. 11B shows the results of Table 1. The experimental values and the theoretical values are in good agreement, and it is presumed that a critical flow is generated in the orifice under the conditions of Experiment 1.

Experiment 2

Figure 12A:
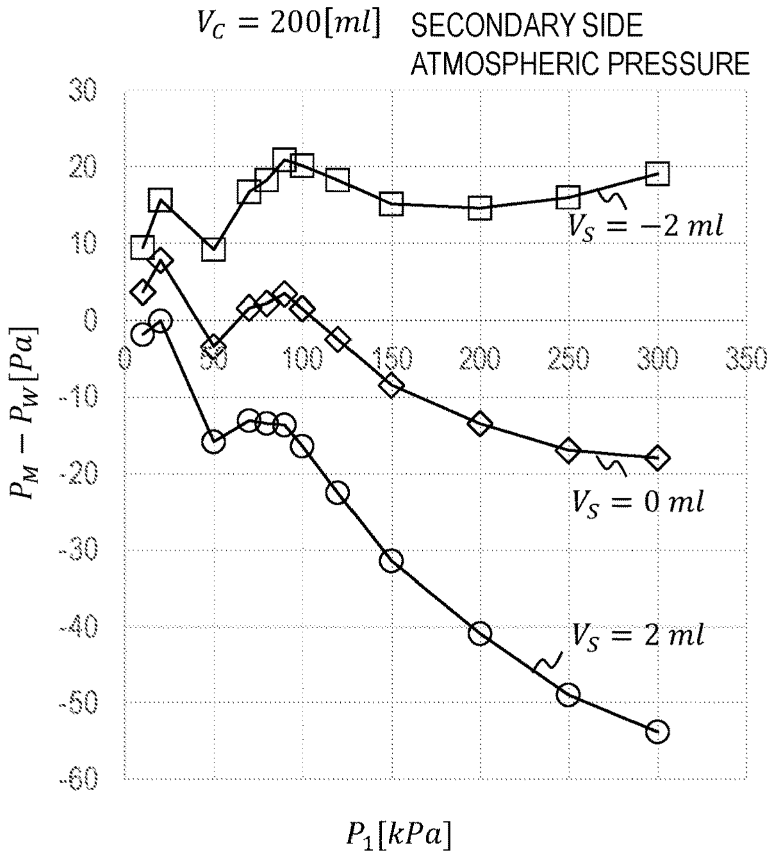
FIG. 12A is a diagram for explaining a result of a large leak test according to the first embodiment (dependence of detected pressure difference on primary side pressure).

FIG. 12A is a graph showing detected pressure difference obtained when a large leak test was performed by employing the first embodiment (secondary side: atmospheric pressure) and the primary side pressure was changed. The graph shows the cases of $V_S$=−2 ml, 0 ml, and 2 ml when $V_C$ was set to 200 ml. When the primary side pressure $P_1$ exceeds 80 kPa (=absolute pressure 181.3 kPa), the behavior of the pressure difference becomes stable.

Figure 12B:
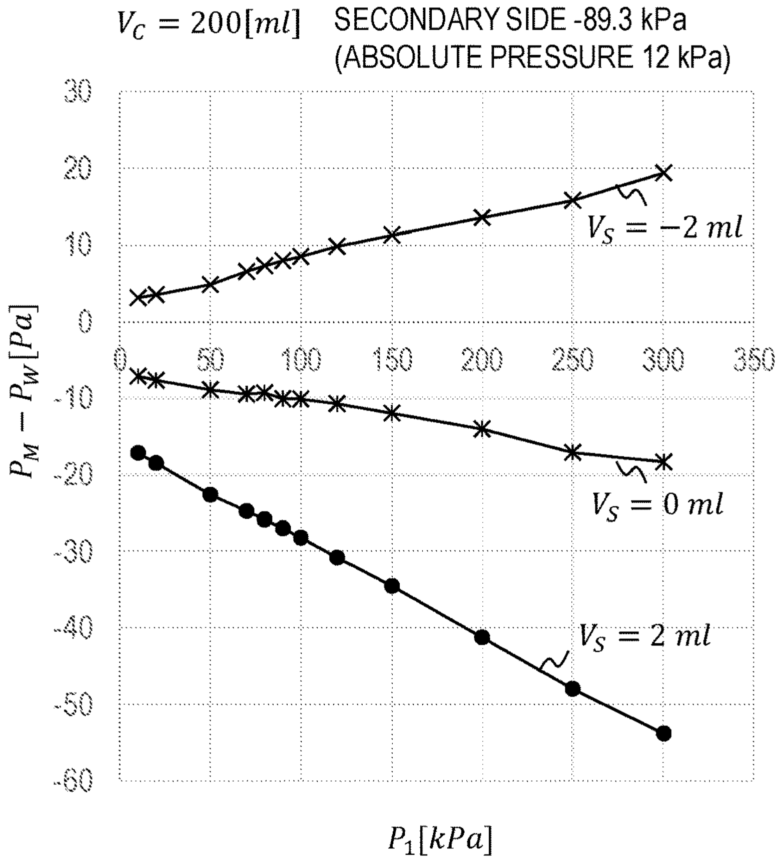
FIG. 12B is a diagram for explaining a result of a large leak test according to the first modification (dependence of detected pressure difference on primary side pressure).

FIG. 12B is a graph showing detected pressure difference obtained when a large leak test was performed by employing the first modification (secondary side negative pressure) and the primary side pressure was changed. The graph shows the cases of $V_S$=−2 ml, 0 ml, and 2 ml when $V_C$ was set to 200 ml. Over the entire test pressure, the primary side pressure and the pressure difference are roughly proportional.

The diameter of the orifice used in the above-mentioned test is 0.15 mm which is the same as that in Experiment 1. The fact that pressure difference is observed even at $V_S$=0 ml is considered to be mainly due to manufacturing errors in the diameters of the two orifices in the master side and the work side. Dealing with manufacturing errors in orifice diameters will be discussed later.

Figure 13A:
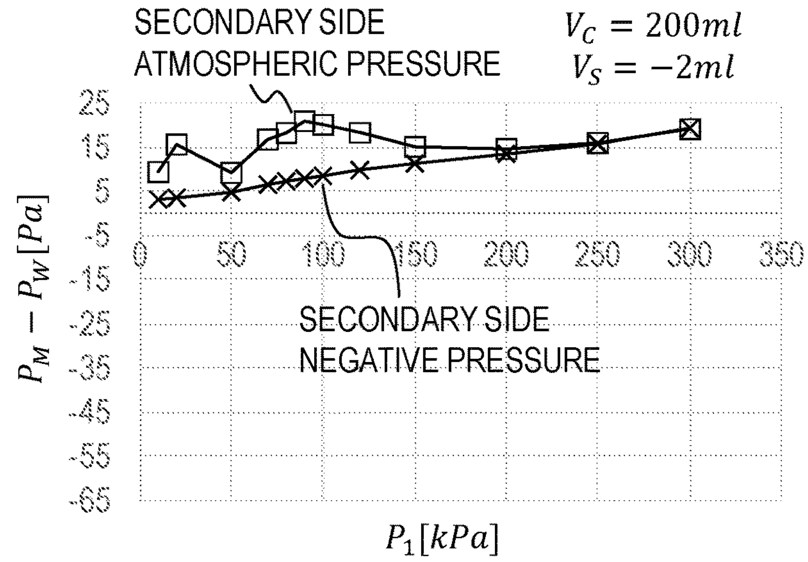
FIGS. 13A, 13B, and 13C are diagrams for explaining a presumed critical pressure ratio of an orifice incorporated valve based on comparison between experimental results of the first embodiment and the first modification.
Figure 13B:
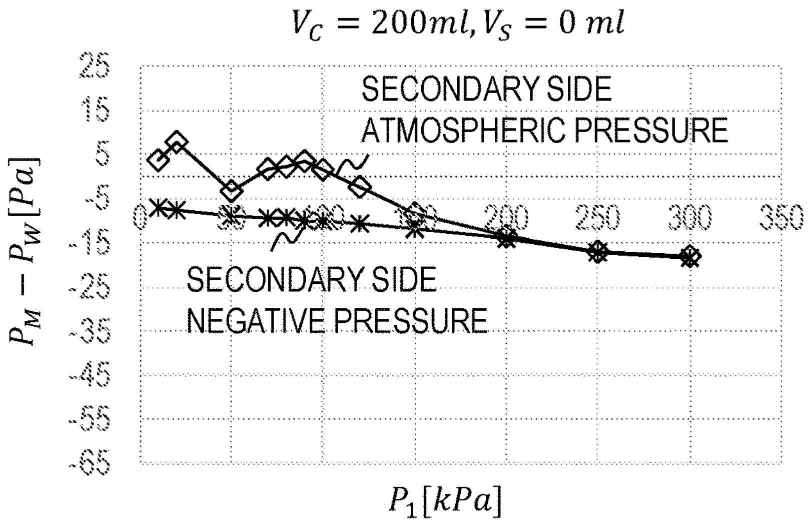
Figure 13C:
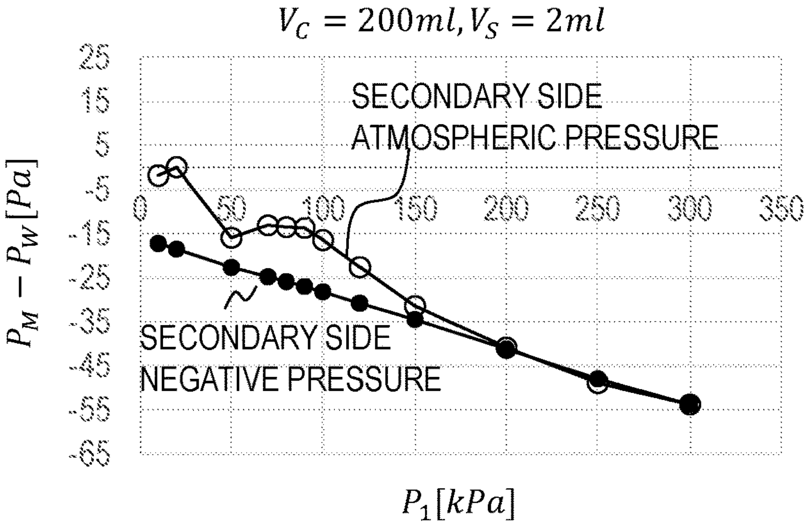

FIGS. 13A, 13B, and 13C are obtained by overlapping FIGS. 12A and 12B for each test volume difference ($V_S$). For any of the volume difference, when the primary side pressure exceeds 200 kPa of gauge pressure (301.3 kPa of absolute pressure), behaviors of pressure difference in the first embodiment and the first modification agree.

Calculating the pressure ratio of the first embodiment at 200 kPa of gauge pressure (301.3 kPa of absolute pressure), the following is obtained.

$$\frac{101.3\text{ kPa}}{301.3\text{ kPa}} \cong 0.33 \tag{19}$$

Note that 101.3 kPa is atmospheric pressure.

From the above, it is considered that the orifice incorporated valve of Experiment 2 exhibits similar behavior to a critical nozzle at 0.33 of pressure ratio or lower.

SUMMARY

In summary, the orifice incorporated valve behaves as a critical nozzle under appropriate pressure ratios. The critical pressure ratio of the orifice incorporated valve is different from that of a critical nozzle.

A critical pressure ratio is considered to vary depending on orifice diameter. When an orifice incorporated valve is used as a critical nozzle, the critical pressure ratio is defined by, for example, the experiments described above.

Third Embodiment

In the first embodiment and the second embodiment the small leak test and the large leak test are performed using pressure difference between the master side air system and the work side air system (the differential pressure method).

ΔP of Formula (2) in "the principle of small leak test" can be measured as change of pressure in the work side air system.

Further, if the amount of emitted gas is set constant (constant opening time of the flow rate control valve), the value of $P_M$ after gas emission can be known in advance in a large leak test. Accordingly, $P_M$-$P_W$ of Formula (9) in "the principle of large leak test" can be also known only by measuring $P_W$.

Therefore, a leak test method and a leak tester using no master will be described as a third embodiment.

Figure 14:
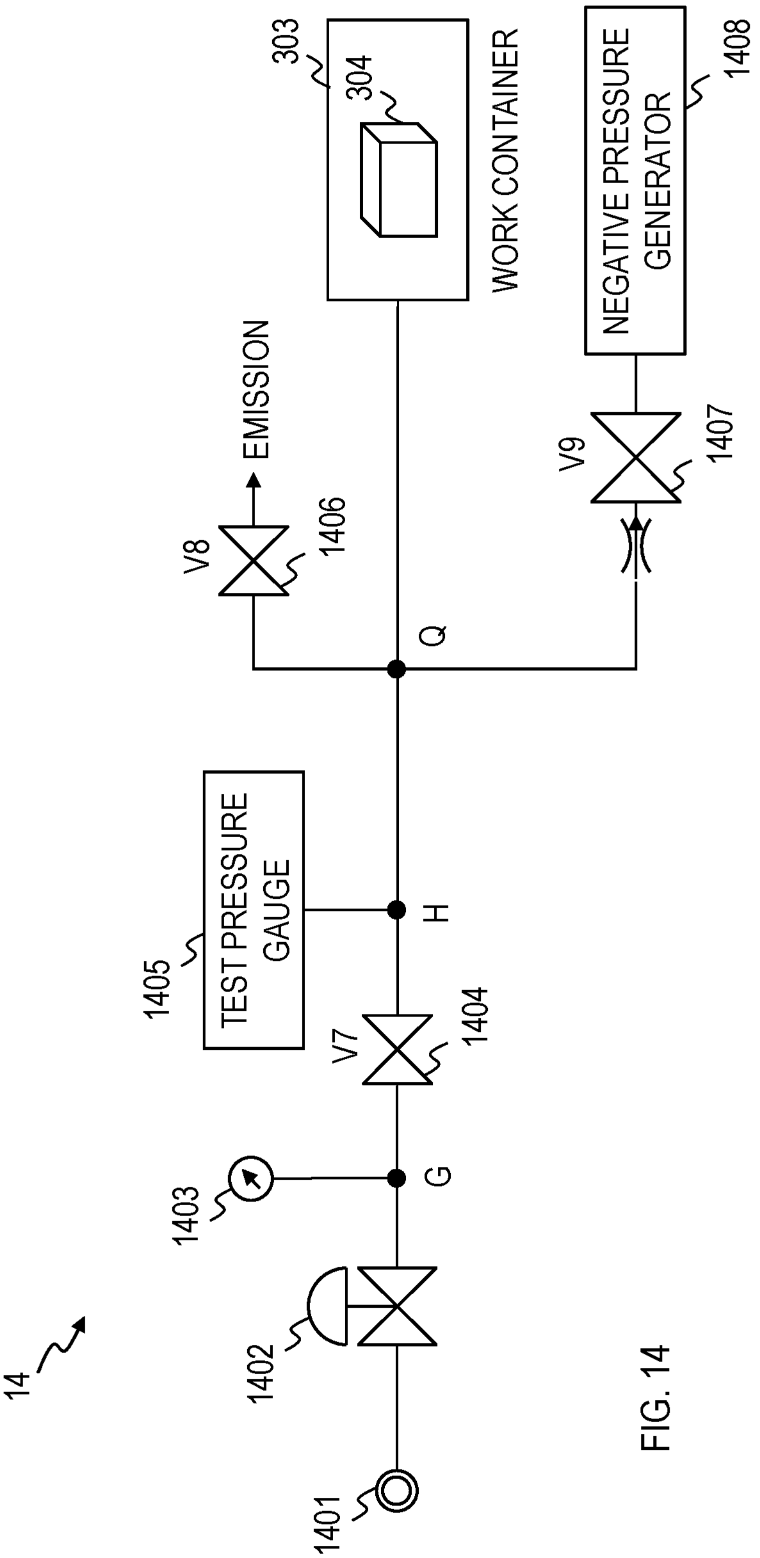
FIG. 14 is an air circuit diagram for explaining a leak tester according to a third embodiment.

FIG. 14 is an air circuit diagram illustrating a configuration example of a leak tester 14 according to the third embodiment.

This leak tester 14 includes a work container 303, a pressurized air supply source 1401, a pressure regulating valve 1402, a pressure gauge 1403, a pressurizing valve 1404, a test pressure gauge 1405, an emission valve 1406, a flow rate control valve 1407, and a negative pressure generator 1408, and these container, air supply source, valves, and gauges are connected by pipelines (air paths) that carry air. Here, the pressurizing valve 1404, the emission valve 1406, and the flow rate control valve 1407 may be abbreviated as V7, V8, and V9 respectively.

The pressure gauge 1403 is connected to a point G on the air path, which couples the pressure regulating valve 1402 and the pressurizing valve 1404.

The test pressure gauge 1405 is connected to a point H on the air path, which couples the pressurizing valve 1404 and the work container 303.

The emission valve 1406 and the flow rate control valve 1407 are connected to a point Q on the air path, which couples the pressurizing valve 1404 and the work container 303.

The air path through "V7-H-Q-work container" is referred to as a "work air system". The work air system also includes the air paths of "H-test pressure gauge", "Q-V8", and "Q-V9" and the work container.

The pressure regulating valve 1402 adjusts the pressure of the pressurized air supply source.

The pressurizing valve 1404 supplies pressurized air to the work air system.

The emission valve 1406 connects the work air system with the outside.

The flow rate control valve 1407 controls the amount of air emitted from the work air system to the negative pressure generator 1408.

<Preparation for Target Product>

The pressurizing valve 1404 and the flow rate control valve 1407 are closed and the emission valve 1406 is opened. Accordingly, the pressure in the work air system becomes atmospheric pressure. In this state, the target product 304 is stored in the work container 303. The target product 304 may be a good product with no air leakage or may be a defective product with air leakage.

<Small Leak Test>

When the emission valve 1406 is closed and the pressurizing valve 1404 is opened, pressurized air is supplied to the work air system. The test pressure gauge 1405 is monitored, and the pressurizing valve 1404 is closed when specified test pressure ($P_1$) is reached.

When the target product 304 is a minor defective product, the pressure of the work air system gradually decreases. When a volume obtained by subtracting the external volume of a reference product from the work air system is denoted as $V_C$, the test pressure gauge 1405 detects pressure drop that appears in Formula (2) of "the principle of small leak test" and a leakage flow rate Q is measured.

When the target product is a good product or a major defective product, pressure drop is not detected in the small leak test. This is because air does not enter the target product when the target product is a good product. Also, this is because the area of the target product where air can enter immediately becomes pressure $P_1$ when the target product is a major defective product.

<Large Leak Test>

When pressure change caused by leakage is inspected and the target product is determined as a good product (acceptance determination) in the small leak test, the test goes to a large leak test. At the end of the small leak test, the pressurizing valve 1404, the emission valve 1406, and the flow rate control valve 1407 are all closed.

Here, a large leak test using only a work air system will be described.

Storing a reference product in the work container (at this time, the internal volume of the work container is $V_C$), applying test pressure $P_1$, and opening and closing the flow rate control valve 1407 for a specified period of time, resultant pressure in the work air system is denoted as $P_M$. When $P_M$-$P_1$ is put as $\Delta P_0$, Formula (20) is obtained.

$$P_M - P_1 = \frac{n_e RT}{V_C} = \Delta P_0 \tag{20}$$

Storing a target product in the work container (at this time, the internal volume of the work container is $V_C$+$V_S$), applying test pressure $P_1$, and opening and closing the flow rate control valve 1407 for a specified period of time, resultant pressure in the work air system is denoted as $P_W$. When $P_W$-$P_1$ is put as $\Delta P_1$, Formula (21) is obtained.

$$P_W - P_1 = \frac{n_e RT}{V_C + V_S} = \Delta P_0 \frac{V_C}{V_C + V_S} = \Delta P_1 \tag{21}$$

When Formula (21) is plotted as a graph with $V_S$ on the horizontal axis and $\Delta P_1$ on the vertical axis, FIG. 15A is obtained. Here, since $n_e$ is "negative" in the fixed-amount emission method, the value of $\Delta P_1$ is negative. Further, $\Delta P_1 = \Delta P_0$ when $V_S=0$ (no large leak), and an absolute value of $\Delta P_1$ is smaller as $V_S$ is larger. Accordingly, it is sufficient to set a threshold value $\Delta P_T$ of $0<|\Delta P_T|<|\Delta P_0|$ and determine that there is a large leak if $|\Delta P_1|<|\Delta P_T|$ (that is, if $V_S$ is large).

<Case where Pressure Change is not Zero in Small Leak Test>

As in the first and second embodiments, even if acceptance determination is obtained in a small leak test, pressure of the work air system does not necessarily remain at $P_1$. It is assumed that the pressure of the work air system is lowered from $P_1$ to $P_E$ as a result of a pressurization type small leak test. When a substance amount of the work air system is denoted as $n_x$, the state of the work air system after performing the small leak test is expressed as Formula (22).

$$P_E(V_C+V_S)=n_xRT \tag{22}$$

The state of the work air system after performing a large leak test (assumed that pressure becomes P'w after emission of substance amount $n_e$) is expressed as Formula (23).

$$P'_W(V_C+V_S)=(n_x+n_e)RT=P_E(V_C+V_S)+E \tag{23}$$

Here, $E=n_eRT$. The following relation is obtained from Formulas (21), (22), and (23).

$$P'_W-P_E=\frac{E}{V_C+V_S}=P_W-P_1 \tag{24}$$

In the result, the value obtained by subtracting $P_E$ from $P'_W$ is equal to $P_W-P_1$.

Based on the above, the pressure $P_E$ at the acceptance determination in the small leak test is first recorded in the large leak test. Then, the flow rate control valve 1407 is opened and closed for a specified period of time so as to emit predetermined substance amount ($n_e$ [mol]) of gas from the flow rate control valve 1407. A value obtained by subtracting $P_E$ from measured pressure ($P'_W$) of the work air system after the emission is compared to the threshold value $\Delta P_T$ so as to determine presence of large leak.

<Test End>

At the end of the large leak test, the pressurizing valve 1404, the emission valve 1406, and the flow rate control valve 1407 are closed.

The emission valve 1406 is opened so as to allow the pressure of the work air system to return to the atmospheric pressure. Subsequently, the work container is opened, the target product is replaced, and the next inspection is performed.

Third Modification

In leak tests, it is difficult to maintain test pressure at a specified value at all times. The amount of gas emitted from a flow rate control valve is proportional to primary side (high pressure side) pressure. Accordingly, if it is assumed that test pressure is not $P_1$ but P', pressure change ΔP' in the work side is Formula (25).

$$\Delta P'=\frac{P'}{P_1}\left(\Delta P_0\frac{V_C}{V_C+V_S}\right) \tag{25}$$

When Formula (25) is plotted as a graph with $V_S$ on the horizontal axis and ΔP' on the vertical axis, FIG. 15B is obtained. The top graph is for the case of $P'<P_1$, the center is for the case of $P'=P_1$, and the bottom is for the case of $P'>P_1$.

When $\Delta P_T$ is determined based on the assumption that the test pressure is $P_1$, if P' is smaller than $P_1$, pressure difference smaller than the threshold value $\Delta P_T$ may be detected even if $V_S$ is actually zero, producing erroneous determination as "large leak exists".

On the other hand, when P' is larger than $P_1$, larger (absolute value of) pressure difference than the threshold value $\Delta P_T$ may be detected even if large $V_S$ is present, producing erroneous determination as "no large leak".

Therefore, the actual test pressure P' is monitored and detected ΔP' is corrected by Formula (26) below.

$$\frac{P_1}{P'}\Delta P'=\frac{P_1}{P'}\left(\frac{P'}{P_1}\left(\Delta P_0\frac{V_C}{V_C+V_S}\right)\right)=\Delta P_0\frac{V_C}{V_C+V_S} \tag{26}$$

Accordingly, the value of ΔP' after the correction comes to be consistent with Formula (21), and the good/bad of the large leak test can be determined by comparison with the threshold value $\Delta P_T$ which is determined based on the test pressure $P_1$.

Fourth Embodiment

In the third embodiment, positive test pressure is applied by the pressurized air supply source 1401 and the negative pressure generator 1408 is connected to the secondary side (low pressure side) of the flow rate control valve.

In a fourth embodiment, negative test pressure is applied by a negative pressure generator instead of the pressurized air supply source 1401 in FIG. 14, and a pressurized air supply source is connected to the primary side (high pressure side) of the flow rate control valve in place of the negative pressure generator 1408. Accordingly, a negative pressure leak test using no master can be realized.

[About Manufacturing Error of Orifice in Differential Pressure Method]

It is difficult to precisely align the diameters of two fine holes in a pair of orifice incorporated valves. Since a gas flow rate is proportional to the diameter of a fine hole, any deviation in diameters causes amounts of gas supplied through orifices to the master side and the work side to be unequal.

Formulas (5) and (6) of "the principle of large leak test" assume that the amounts of gas injected into or emitted from the flow rate control valve are equally set to $n_e$, but the case where the amounts of gas are mutually different due to orifice diameter errors will be first considered.

When the amount of gas supplied to the master side is denoted as $e_M$ and the amount of gas supplied to the work side is denoted as $e_W$, Formulas (5) and (6) are rewritten as follows.

$$P_MV_C=(n_M+e_M)RT=P_1V_C+e_MRT \tag{27}$$

-continued $$P_W(V_C+V_S)=(n_W+e_W)RT=P_1(V_C+V_S)+e_WRT \quad (28)$$

From Formulas (27) and (28), pressure difference can be expressed as Formula (29).

$$P_M-P_W=\left(P_1+\frac{e_MRT}{V_C}\right)-\left(P_1+\frac{e_WRT}{V_C+V_S}\right)=RT\frac{(e_MV_S+(e_M-e_W)V_C)}{V_C(V_C+V_S)} \quad (29)$$

Thus, if $e_M$ and $e_W$ are not equal, pressure difference is observed even if $V_S$ (a volume into which air can enter) is zero.

Figure 16:
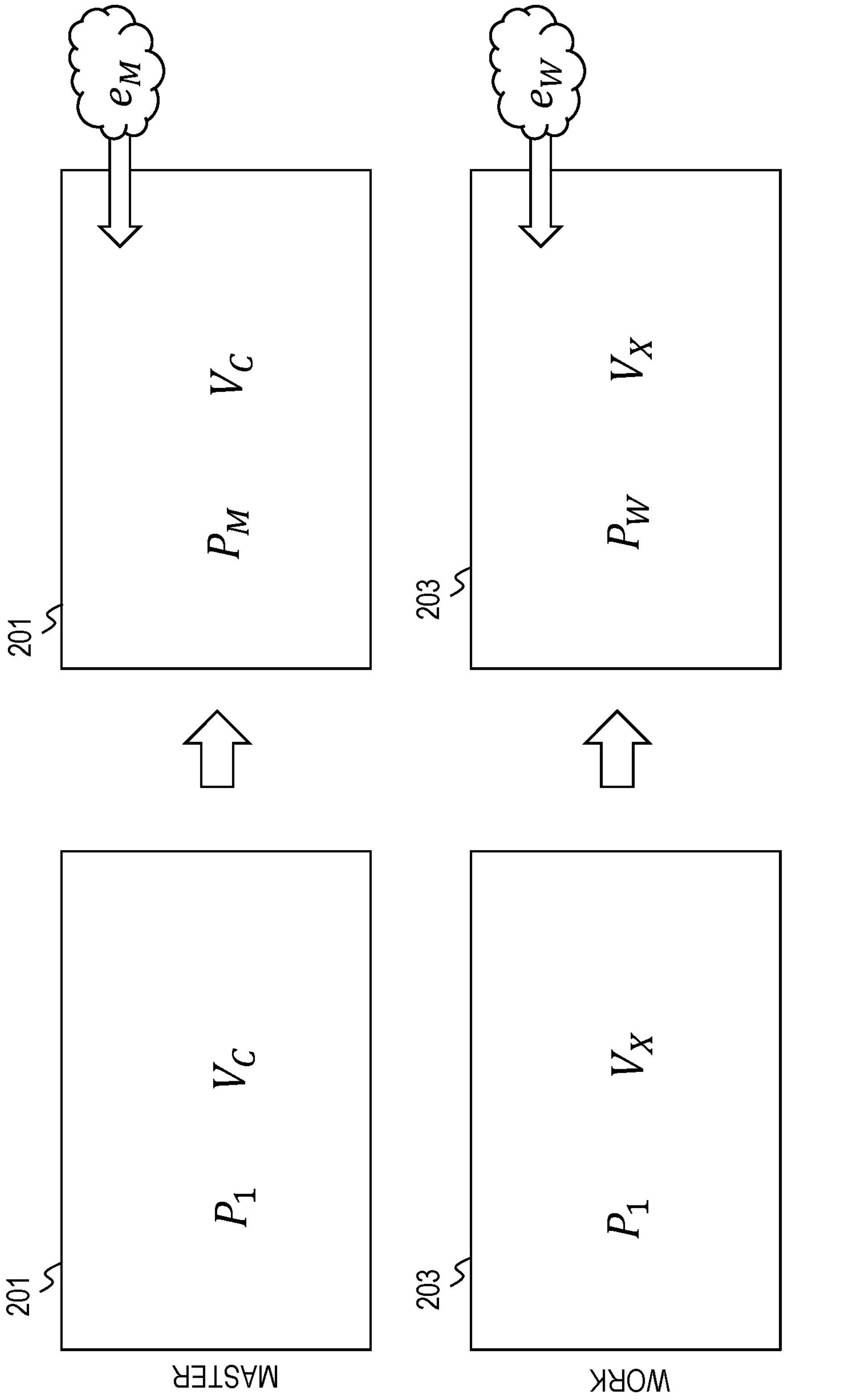
FIG. 16 is a diagram for explaining conditions of a master side volume and a work side volume for canceling manufacturing errors of orifices.

Next, the case will be considered where internal volumes of the master side and the work side are set to be mutually different and air is supplied through orifices having different diameters (also see FIG. 16). The work side internal volume is denoted as $V_X$ and the master side internal volume is denoted as $V_C$ as the above.

When test pressure is denoted as $P_1$ and pressure in master side container and pressure in work side container after supplying $e_M$ of gas to the master side and $e_W$ of gas to the work side are denoted as $P_M$ and $P_W$ respectively, respective pressure changes are expressed by Formulas (30) and (31).

$$P_MV_C=P_1V_C+e_MRT\rightarrow P_M-P_1=\frac{e_MRT}{V_C} \quad (30)$$

$$P_WV_C=P_1V_C+e_WRT\rightarrow P_W-P_1=\frac{e_WRT}{V_X} \quad (31)$$

Accordingly, if the following Formula (32) is satisfied, pressure difference between the work side and the master side can be set to zero.

$$\frac{e_M}{V_C}=\frac{e_W}{V_X} \quad (32)$$

Figure 17:
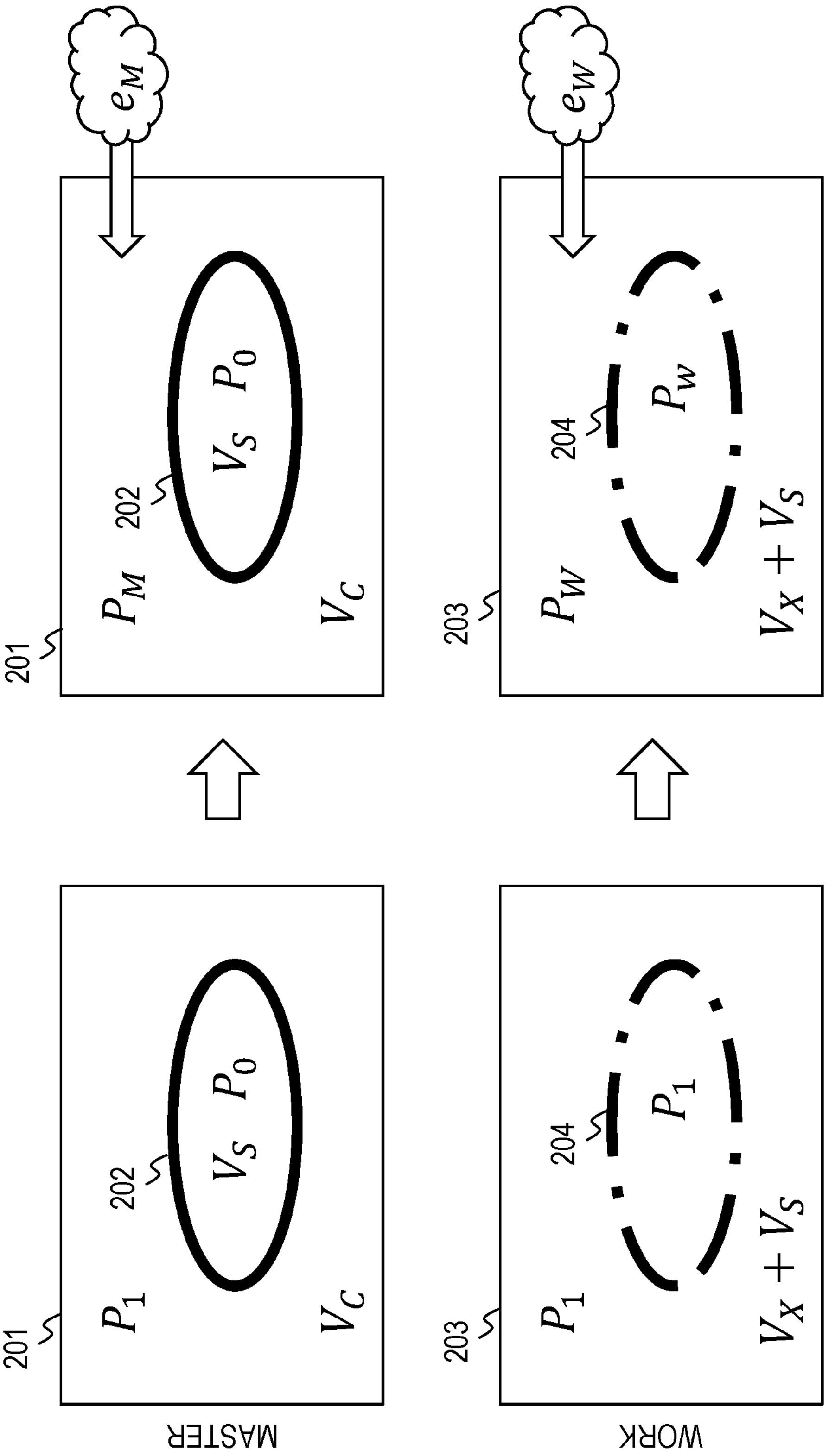
FIG. 17 is a diagram for explaining how work side volume adjustment allows pressure difference to be proportional to $V_S$ even when there are manufacturing errors in orifices.

Formulas (5) and (6) will be reconsidered under the conditions of Formula (32) (also see FIG. 17). Pressure change in the master side is expressed as Formula (33).

$$P_MV_C=(n_M+e_M)RT=P_1V_C+e_MRT \quad (33)$$

Pressure change in the work side is expressed as Formula (34).

$$P_W(V_X+V_S)=(n_W+e_W)RT=P_1(V_X+V_S)+e_WRT \quad (34)$$

From Formulas (33) and (34), $$P_M-P_W=\left(P_1+\frac{e_MRT}{V_C}\right)-\left(P_1+\frac{e_WRT}{V_X+V_S}\right)=RT\frac{e_M(V_X+V_S)-e_WV_C}{V_C(V_X+V_S)} \quad (35)$$

is obtained. Since $e_MV_X=e_W V_C$ based on Formula (32), $$P_M-P_W=RT\frac{e_MV_S}{V_C(V_X+V_S)} \quad (36)$$

is obtained. When $V_X>>V_S$, Formula (36) indicates that pressure difference proportional to $V_S$ is detected.

In other words, by adjusting the internal volume of the work side in advance so as to satisfy Formula (32) (so as to be able to obtain the same pressure change as in the master side under the specified test pressure), pressure difference proportional to $V_S$ (the volume at which air can enter or exit a target product) can be obtained even if there is difference in orifice diameters.

The foregoing description of the embodiments of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A leak tester comprising:

a master container which stores a reference product;

a master side air circuit which is connected with the master container;

a work container which stores a target product;

a work side air circuit which is connected with the work container;

a first valve which controls pressure air, the pressure air being supplied to the master side air circuit and the work side air circuit;

a second valve which connects the master side air circuit and the work side air circuit with an outside;

a flow rate control valve which controls an amount of air, the air being emitted from the master side air circuit and the work side air circuit to the outside or being injected into the master side air circuit and the work side air circuit from the outside; and a differential pressure gauge which measures pressure difference between the master side air circuit and the work side air circuit.

2. The leak tester according to claim 1, wherein the flow rate control valve includes two air paths, an orifice plate which has a fine hole for regulating a flow rate in each of the air paths, and a valve which opens and closes the two air paths simultaneously.

3. The leak tester according to claim 1, further comprising:

a pressurized air supply source which is connected with the first valve; and a negative pressure generator which is connected to an external side of the flow rate control valve.

4. The leak tester according to claim 1, further comprising:

a negative pressure generator which is connected with the first valve; and a pressurized air supply source which is connected to an external side of the flow rate control valve.

5. A leak tester comprising:

a work container which stores a target product;

a work air circuit which is connected with the work container;

a first valve which controls pressure air, the pressure air being supplied to the work air circuit;

a second valve which connects the work air circuit with an outside;

a flow rate control valve which controls an amount of air, the air being emitted from the work air circuit to the outside or being injected into the work air circuit from the outside; and a pressure gauge which measures pressure of the work air circuit.

6. The leak tester according to claim 5, further comprising:

a pressurized air supply source which is connected with the first valve; and a negative pressure generator which is connected to an external side of the flow rate control valve.

7. The leak tester according to claim 5, further comprising:

a negative pressure generator which is connected with the first valve; and a pressurized air supply source which is connected to an external side of the flow rate control valve.

* * * * *